(12) United States Patent
Paraskos

(10) Patent No.: US 12,296,634 B2
(45) Date of Patent: May 13, 2025

(54) GLADHAND COUPLER ASSEMBLY

(71) Applicant: isee, Cambridge, MA (US)

(72) Inventor: Gregory James Paraskos, Medford, MA (US)

(73) Assignee: ISEE, Cambridge, MA (US)

( * ) Notice: Subject to any disclaimer, the term of this patent is extended or adjusted under 35 U.S.C. 154(b) by 699 days.

(21) Appl. No.: 17/568,185

(22) Filed: Jan. 4, 2022

(65) Prior Publication Data

US 2023/0211838 A1    Jul. 6, 2023

(51) Int. Cl.
*B60D 1/64* (2006.01)
*B62D 53/12* (2006.01)
*B60D 1/01* (2006.01)

(52) U.S. Cl.
CPC ............. *B60D 1/64* (2013.01); *B62D 53/125* (2013.01); *B60D 1/015* (2013.01)

(58) Field of Classification Search
CPC ........................................................ B60D 1/64
See application file for complete search history.

(56) References Cited

U.S. PATENT DOCUMENTS

| | | | |
|---|---|---|---|
| 4,500,057 A | 2/1985 | Duwelz | |
| 4,943,079 A | 7/1990 | Harbold | |
| 6,179,319 B1 * | 1/2001 | Malisch | B62D 53/125 280/477 |
| 6,817,879 B2 | 11/2004 | Mulvenna et al. | |
| 6,863,538 B2 | 3/2005 | Mattern et al. | |
| 7,401,801 B2 * | 7/2008 | Halverson | B60T 17/043 285/70 |
| 7,793,966 B2 | 9/2010 | Richter et al. | |
| 8,505,949 B2 | 8/2013 | Temple et al. | |
| 9,266,440 B2 | 2/2016 | Gao et al. | |
| 10,294,084 B2 | 5/2019 | Hermey et al. | |
| 11,560,188 B2 * | 1/2023 | Moore | B60D 1/64 |

(Continued)

FOREIGN PATENT DOCUMENTS

| | | |
|---|---|---|
| DE | 19913911 A1 | 10/1999 |
| EP | 539675 B1 | 6/1995 |

(Continued)

OTHER PUBLICATIONS

International Search Report and Written Opinion from corresponding International Application No. PCT/US2022/053357 dated May 10, 2023.

*Primary Examiner* — Kevin Hurley
(74) *Attorney, Agent, or Firm* — Lando & Anastasi, LLP

(57) ABSTRACT

A gladhand coupler assembly is configured to releasably couple to a gladhand coupler having a mating seal and first and second mating structures. The gladhand coupler assembly includes an assembly mating seal for interfacing with the gladhand coupler mating seal and first and second assembly mating structures coupled to the assembly mating seal. The first and second assembly mating structures are configured to interface with the gladhand coupler first and second mating structures, respectively. The gladhand coupler assembly further includes an actuation mechanism configured to move the assembly mating seal relative to the pair of rigidly fixed assembly mating structures. The gladhand actuation mechanism is further configured to place the assembly mating seal into and out of fluid communication with the gladhand coupler mating seal.

25 Claims, 24 Drawing Sheets

(56) References Cited

U.S. PATENT DOCUMENTS

| | | | |
|---|---|---|---|
| 11,999,206 B2* | 6/2024 | Lacaze | B60D 1/62 |
| 12,084,131 B2* | 9/2024 | Köster | B60D 1/64 |
| 2012/0080563 A1 | 4/2012 | Gryniewski et al. | |
| 2012/0200078 A1 | 8/2012 | Puluc et al. | |
| 2014/0007386 A1 | 1/2014 | Liao | |
| 2019/0299732 A1 | 10/2019 | Smith et al. | |
| 2019/0302764 A1 | 10/2019 | Smith et al. | |
| 2019/0367105 A1 | 12/2019 | Grossman | |
| 2020/0264607 A1 | 8/2020 | Smith et al. | |
| 2021/0053407 A1 | 2/2021 | Smith et al. | |
| 2021/0061376 A1 | 3/2021 | Moore et al. | |
| 2022/0227435 A1 | 7/2022 | Moore et al. | |
| 2022/0332158 A1 | 10/2022 | Layfield et al. | |
| 2022/0371199 A1 | 11/2022 | Schultz et al. | |
| 2022/0371570 A1 | 11/2022 | Yu et al. | |
| 2023/0046740 A1 | 2/2023 | Poulson et al. | |
| 2024/0043075 A1 | 2/2024 | Johannes et al. | |

FOREIGN PATENT DOCUMENTS

| | | |
|---|---|---|
| EP | 3102527 B1 | 8/2018 |
| EP | 3698992 A1 | 8/2020 |
| WO | 9709754 A1 | 3/1997 |

* cited by examiner

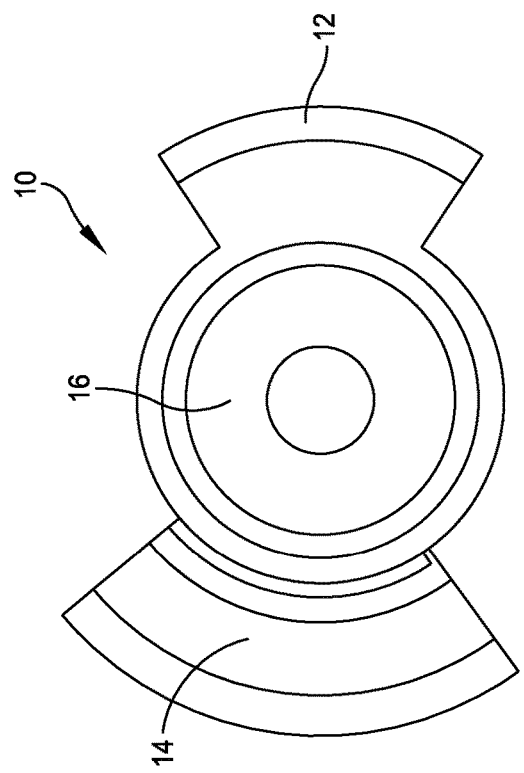
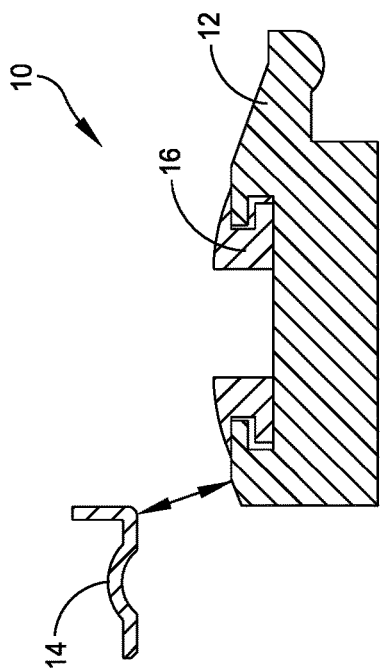
FIG. 1A
FIG. 1B

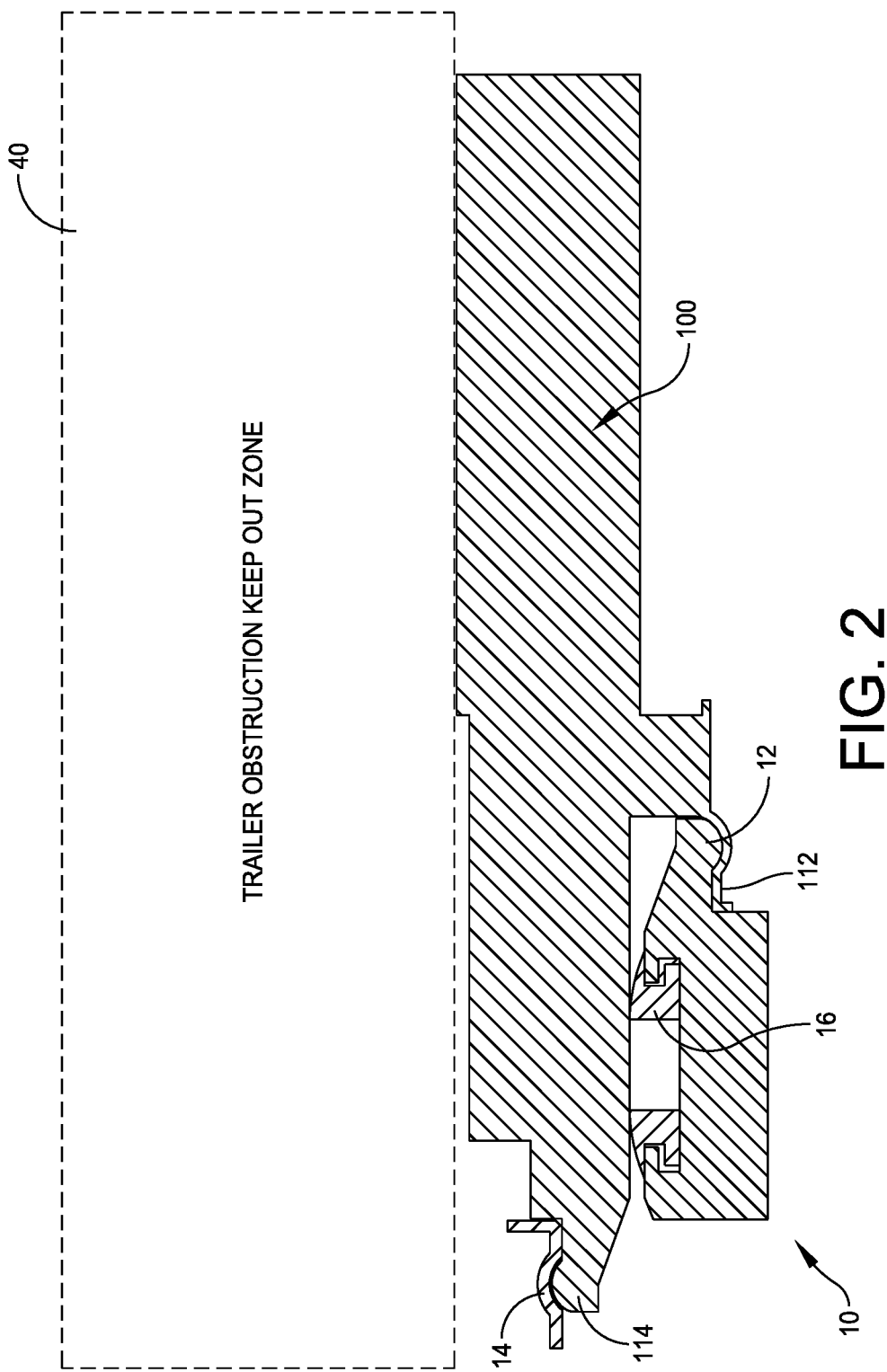

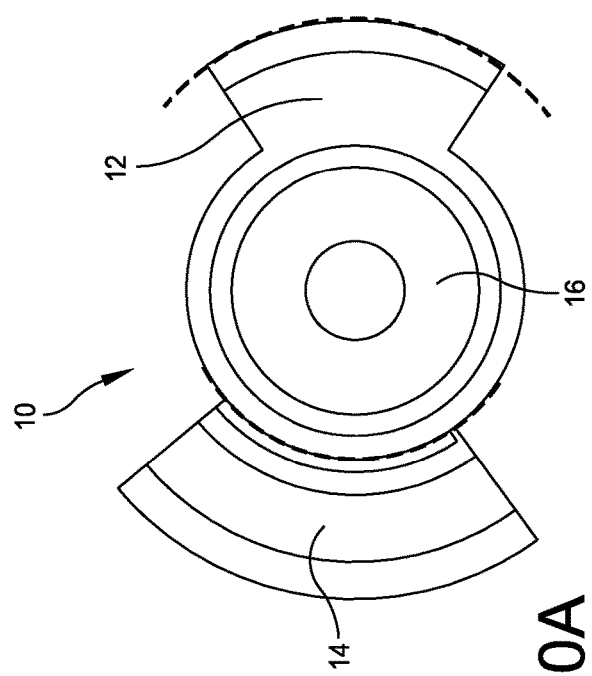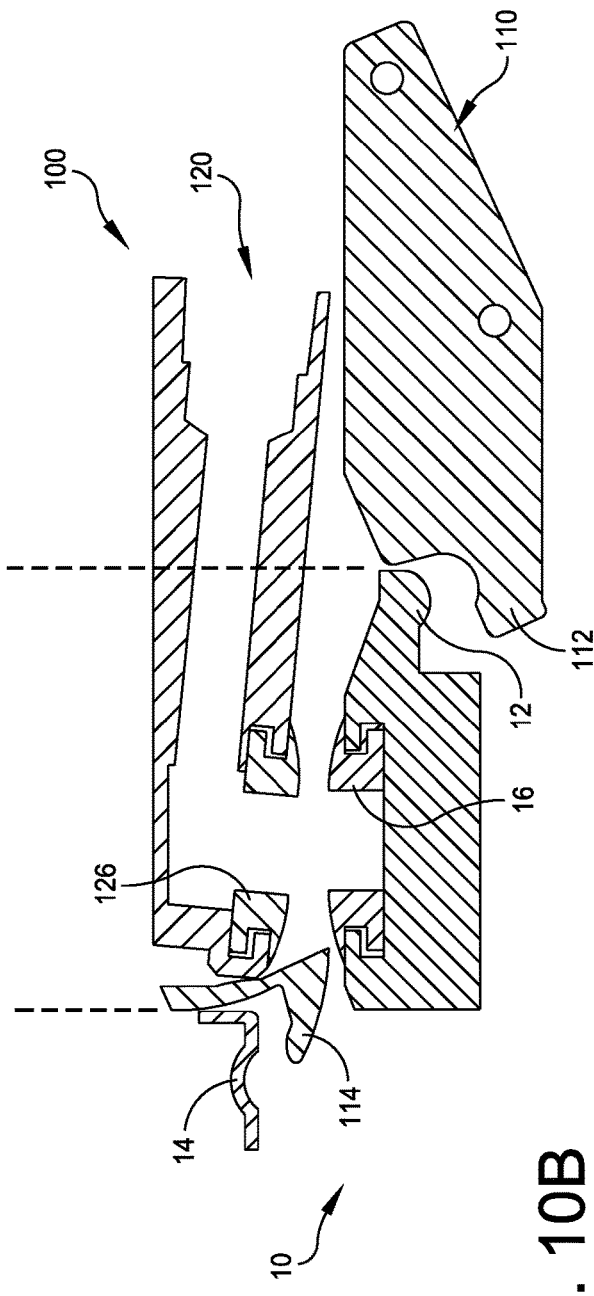
FIG. 10A
FIG. 10B

GLADHAND COUPLER ASSEMBLY

BACKGROUND OF THE DISCLOSURE

1. Field of the Disclosure

This application relates generally to an apparatus for locking gladhand couplers together, more particularly to an apparatus which automatically couples to a gladhand coupler.

2. Discussion of Related Art

In shipping and transport, braking systems are needed to ensure that cargo trailers and cars brake appropriately with the vehicle hauling them. Various braking systems exist, but air brake systems are particularly common on tractor-trailers and trains. George Westinghouse developed the original air brake systems for use on trains in the 1870s. The use of air brakes has since been expanded to other types of vehicles, and they are now a common braking system throughout the world. For a typical tractor-trailer, air brake systems use pressurized tubes connected between the tractor unit and the trailer unit. The pressurized tube applies air to a piston, which pushes the piston against a brake pad or brake shoe to stop the vehicle. However, because tractor units and trailer units are normally severable, unitary braking lines are generally not used. Instead, the trailer will have one part of the line, and the tractor will have another part of the line, and the two lines will be connected by a gladhand coupler.

The gladhand coupler is a standardized design which follows certain minimum requirements laid out in international standards, such as the Society of Automotive Engineer's SAE J318. Gladhand couplers are hermaphroditic, allowing each one to attach to any other, thus ensuring that any tractor unit can use the air brakes of any trailer. The gladhand coupler is designed in such a way that it forms a tight seal when coupled to another gladhand coupler, which allows pressurized fluids to pass between the tractor and trailer sides of the system. Such systems allow drivers, located in the tractor cab, to control the trailer's brakes.

However, certain issues arise when using standard gladhand couplers. For example, gladhand couplers are manually operated and require a roughly 90-degree twisting motion to lock together, which can lead to errors in use and increase wear and tear. Errors in use can lead to brake failures, which can cause catastrophic injuries and other losses. Accordingly, there is a need in the art for a better, automated coupling mechanism.

SUMMARY OF THE DISCLOSURE

One aspect of the present disclosure is directed to a gladhand coupler assembly configured to releasably couple to a gladhand coupler having a mating seal and first and second mating structures. In one embodiment, the gladhand coupler assembly comprises an assembly mating seal for interfacing with the gladhand coupler mating seal and first and second assembly mating structures coupled to the assembly mating seal. The first and second assembly mating structures are configured to interface with the gladhand coupler first and second mating structures, respectively, with the first and second assembly mating structures being rigidly fixed to each other so as to limit independent motion of the first assembly mating structure relative to the second assembly mating structure. The gladhand coupler assembly further comprises an actuation mechanism coupled to at least one of the assembly mating seal and the first and second assembly mating structures. The actuation mechanism is configured to move the assembly mating seal relative to the pair of rigidly fixed assembly mating structures. The gladhand actuation mechanism is further configured to place the assembly mating seal into and out of fluid communication with the gladhand coupler mating seal.

Embodiments of the gladhand coupler assembly further may include configuring the actuation mechanism allows manual operation. The actuation mechanism may include a motor and a mechanical linkage coupled to the motor. The motor may be a rotary pneumatic or electromagnetic motor. The motor may be a linear motor. The mechanical linkage may include a 4-bar linkage. The mechanical linkage may include a cam associated with the motor and a cam follower coupled to the at least one of the assembly mating seal and the first and second assembly mating structures. The gladhand coupler assembly further may include a support and an assembly coupler arm, wherein the assembly coupler arm is pivotably coupled to the support. The gladhand coupler assembly further may include at least one spring configured to bias one of the support and the assembly coupler arm. The motor may be configured to lock the mechanical linkage in place to maintain the assembly mating seal in fluid communication with the gladhand coupler mating seal.

Another aspect of the present disclosure is directed to a method of releasably securing a gladhand coupler assembly to a gladhand coupler. In one embodiment, the method comprises: providing a gladhand coupler assembly configured to manipulate an assembly mating seal and first and second assembly mating structures with respect to a mating seal and first and second mating structures of a gladhand coupler; initializing the gladhand coupler assembly into a disengaged position; positioning the gladhand coupler assembly with respect to a gladhand coupler so that the mating seal and the first and second mating structures of the gladhand coupler are proximate to the assembly mating seal and the first and second assembly mating structures of the gladhand coupler assembly, with the first and second assembly mating structures being rigidly fixed to each other so as to limit independent motion of the first assembly mating structure relative to the second assembly mating structure, and with the mating seals unable to touch each other while in the disengaged position; and actuating the gladhand coupler assembly to move the gladhand coupler assembly from engaged and disengaged conditions and to place the assembly mating seal into and out of fluid communication with the gladhand coupler mating seal to lock the assembly mating seal with respect to the mating seal of the gladhand coupler.

Embodiments of the method further may include positioning the gladhand coupler assembly by using a robotic arm to position the gladhand coupler assembly with respect to the gladhand coupler. Actuating the gladhand coupler assembly may include using an actuation mechanism to move the gladhand coupler assembly. The actuation mechanism may include a motor. The method further may include biasing the assembly mating seal.

Yet another aspect of the present disclosure is directed to a gladhand coupler assembly configured to releasably secure a gladhand coupler having a first mating seal and first and second mating structures. In one embodiment, the gladhand coupler assembly comprises a coupler support including first and second assembly mating structures rigidly fixed to each other so as to limit independent motion of the first assembly mating structure relative to the second assembly mating structure and a coupler arm pivotably connected to the coupler support. The coupler arm is in fluid communication with a pneumatic air source. The coupler arm includes a second mating seal and is configured to move relative to the coupler support, when the first and second assembly mating structures are proximate to the first and second mating structures of the gladhand coupler, between a first position in which the second mating seal is spaced from the first mating seal and a second position in which the second mating seal of the gladhand coupler assembly sealingly engages the first mating seal of the gladhand coupler and the gladhand coupler assembly is secured to the gladhand coupler. The gladhand coupler assembly further comprises an actuation mechanism configured to move the coupler arm between the first position and the second position.

Embodiments of the gladhand coupler assembly further may include configuring the actuation mechanism to include a motor assembly having a motor supported by the coupler support. The coupler arm includes a cam follower, and the motor assembly further includes a cam coupled to the motor, the cam being configured to manipulate the cam follower to move the coupler arm between the first position and the second position. The gladhand coupler assembly further may include a spring to bias the coupler arm with respect to the coupler support to the first position. The spring may be secured at one end to the coupler support and at an opposite end to the coupler arm.

Another aspect of the present disclosure is directed to a method of securing a gladhand coupler assembly to a gladhand coupler having a first mating seal and first and second mating structures. In one embodiment, the method comprises: providing a gladhand coupler assembly configured to be manipulated between a first position, in which a second mating seal of the gladhand coupler assembly is spaced from the first mating seal, and a second position, in which the second mating seal of the gladhand coupler assembly sealingly engages the first mating seal of the gladhand coupler, the gladhand coupler assembly including first and second assembly mating structures that are rigidly fixed to each other so as to limit independent motion of the first assembly mating structure relative to the second assembly mating structure; and positioning the gladhand coupler assembly with respect to a gladhand coupler so that the first mating seal of the gladhand coupler is proximate to the second mating seal of the gladhand coupler assembly; and operating the gladhand coupler assembly to move the gladhand coupler assembly from the first position to the second position to secure the gladhand coupler to lock the second assembly mating seal with respect to the first mating seal of the gladhand coupler.

Embodiments of the method further may include positioning the gladhand coupler assembly by using a robotic arm to position the gladhand coupler assembly with respect to the gladhand coupler. Operating the gladhand coupler assembly may include using an actuation mechanism to move the gladhand coupler assembly from the first position to the second position. The method further may include biasing the coupler arm to the first position. Biasing the coupler arm may include a spring secured at one end to the coupler support and at an opposite end to the coupler arm.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 1A is a top plan view of a gladhand coupler;

FIG. 1B is a cross-sectional view of the gladhand coupler shown in FIG. 1A;

FIG. 2 is a cross-sectional view of a gladhand coupler assembly secured to the gladhand coupler;

FIG. 10A is a top plan view of the gladhand coupler, indicating locations of certain contact surfaces;

FIG. 10B is a cross-sectional view of the gladhand coupler assembly and the gladhand coupler with the gladhand coupler assembly proximate to the gladhand coupler prior to being secured to the gladhand coupler;

DETAILED DESCRIPTION OF THE DISCLOSURE

Figure 3:
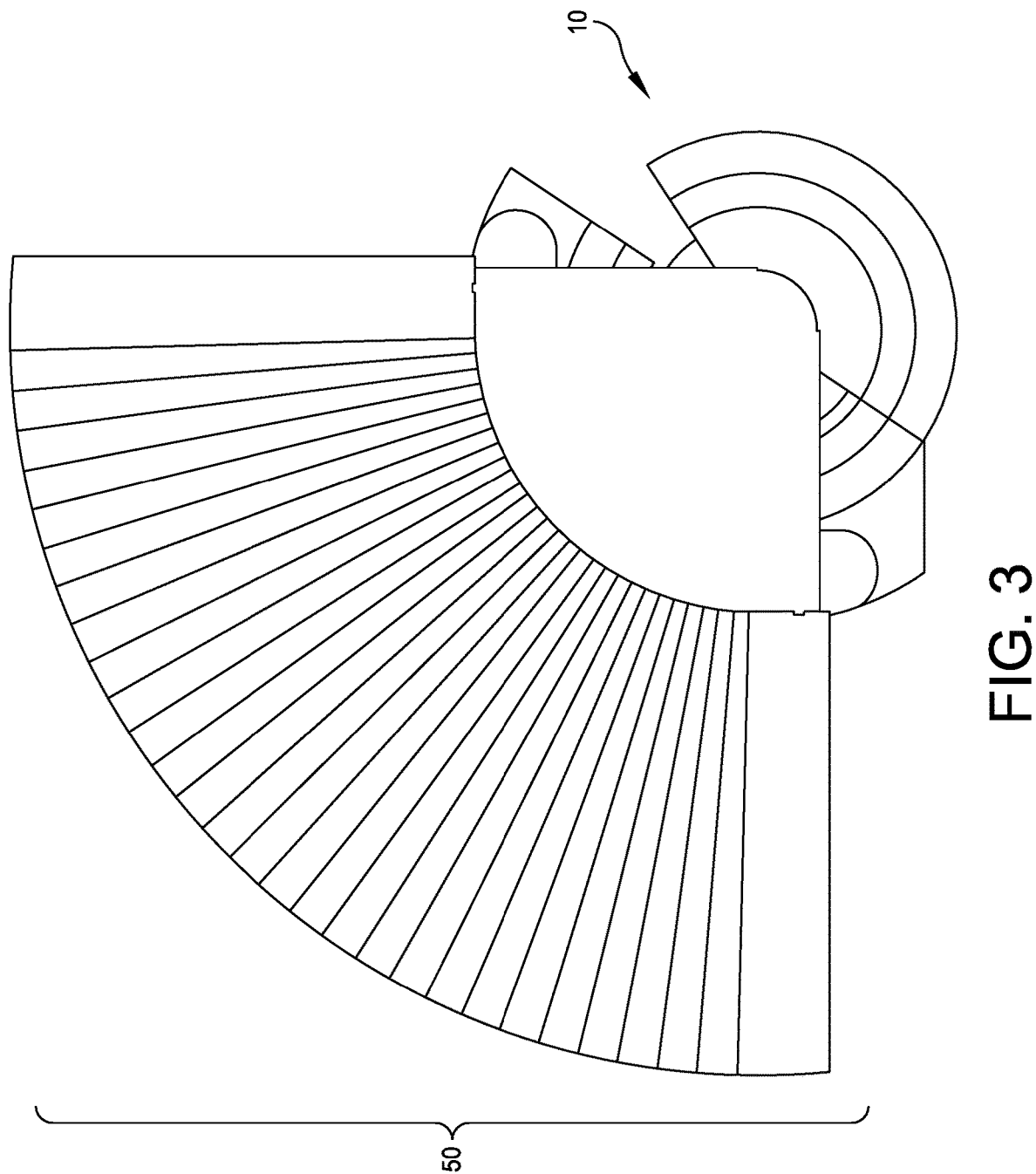
FIG. 3 is a top plan view of the gladhand coupler showing a 90-degree arc of rotation the gladhand coupler.

Gladhand couplers are routinely used to couple hoses together. Two gladhand couplers must form a tight seal, to prevent pressure loss. In most cases, gladhand couplers are operated manually, with a truck driver or train engineer physically bringing the gladhand couplers together and locking them together using a twisting motion. As mentioned previously, this method is error prone and can lead to undesirable wear and tear on the mating seals of the gladhand couplers. In the worst-case scenarios, failure to properly connect the gladhand couplers can result in the failure of an air brake system, potentially resulting in death or catastrophic loss.

Gladhand couplers have certain defined features, which are laid out in standards such as SAE J318 and ISO 1728. Among these features is a defined spatial relationship between a first and second locking structure, which requires that the locking structures move together as essentially a single, unitary structure, although some relative motion of the constituent parts may be allowed within acceptable tolerances. Additionally, these locking structures are designed to be hermaphroditic, such that any gladhand coupler can connect to any other gladhand coupler, regardless of other structural differences between them. Additionally, all gladhand couplers have a mating seal which is used to form a seal with other gladhand couplers when locked together. This mating seal is often made of a rubber or rubber-like material, such as silicone, and may be replaceable.

Gladhand couplers are typically manufactured as rigid structures, such that the metal portions are either a single piece or coupled together to move as a single piece. As a result of this physical structure, it is not possible to lock together two normal gladhand couplers by approaching one gladhand coupler at an angle with the other because the mating seal portion will get in the way. Instead, it is necessary to align the gladhand coupler's locking structures so that they are side-by-side and parallel with one another, and then to rotate at least one gladhand coupler relative to another by about 90 degrees. This rotation allows the locking structures to slide into each other, thus securing the gladhand couplers together and compressing the seals together so the seals are air-tight. However, this rotation also causes the gladhand couplers' mating seals to wear over time, which eventually requires the gladhand coupler or the mating seal to be replaced. Furthermore, the alignment and rotation described in this paragraph is a more complex set of motions than those required by the present invention, which makes the present invention easier to use, especially when the user is an automated system, such as a robot.

Disclosed herein is an apparatus which may approach a gladhand coupler in a parallel manner. Specifically, locking structures and a mating seal of the apparatus may be at an angle relative to respective locking structures and a mating seal of the gladhand coupler, and then the apparatus may, without rotation in the plane of the mating seal of the gladhand coupler, form a seal with the gladhand coupler. This apparatus, called a gladhand coupler assembly, may be operated manually, semi-autonomously, or fully autonomously, depending on the embodiment. Additionally, in some embodiments, the gladhand coupler assembly is configured so that, when locked together with a gladhand coupler, no active power is required to maintain the lock. Furthermore, this apparatus is configured to remain outside of keep-out zones, which are areas that contain obstructions or which, for other reasons, it is desirable that the gladhand coupler assembly should not enter. In some embodiments, a coupler arm not directly connected to the first or second locking structures of the gladhand coupler assembly allows the locking structures and coupler arm to move semi-independently. This facilitates the approach of the gladhand coupler assembly to the gladhand coupler, which in turn offers various advantages, such as eliminating the need for rotation in the plane of the gladhand coupler mating seal, and reducing wear and tear on the mating seals and simplifying the task for a robot.

In general, the system may be actuated by a mechanical linkage. A mechanical linkage is any mechanical device which is suitable to drive the locking and unlocking of the gladhand coupler assembly. Examples of mechanical linkages include a cam and cam follower system, or a 4-bar link system, or any other appropriate system that is configured to be actuated by an actuator, e.g., a motor.

It will be appreciated that embodiments of the systems and apparatuses discussed herein are not limited in application to the details of construction and arrangement of the components set forth in the following descriptions or illustrated in the accompanying drawings. The systems and apparatuses are capable of implementation in other embodiments or being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing, "involving" and variations thereof is meant to encompass the items listed thereafter and equivalents thereof as well as additional items. Reference to "or" may be construed as inclusive so that any terms using "or" may indicate of a single, more than one, or all of the described terms. Any references to front and back, left and right, top and bottom, upper and lower, and vertical and horizontal are intended for convenience of description, not to limit the present systems and methods or their components to any one positional or spatial orientation.

Referring to the drawings, and more particularly to FIGS. 1A and 1B a common embodiment of a gladhand coupler is shown and described. Gladhand couplers are interlocking hose couplings fitted to hoses which supply pressurized fluids between two places. It will be appreciated that fluids may be liquids or gasses. Gladhand couplers are commonly used on tractor-trailers (semi-trucks) and between railroad cars, where they provide pressurized air for air braking systems. Gladhand couplers have certain characteristics defined by international standards, for example, the Society of Automotive Engineer's SAE J318 or the International Organization for Standardizations ISO 1728. These set requirements include the spatial relationship of the first and second locking structures, which is fixed and constant for all gladhand couplers. However, not every gladhand coupler is identical, and the standards only require that certain elements be identical. It should therefore be understood that FIGS. 1A and 1B depict an exemplary or idiomatic gladhand coupler, and that other, functionally equivalent variations exist. It will also be understood that the parts illustrated in the drawing figures are not drawn to scale, and do not necessarily show the precise sizes and spatial configuration of the components.

Referring to FIG. 1A, an exemplary embodiment of a gladhand coupler is generally indicated at 10. As shown, the gladhand coupler 10 includes first and second locking structures 12, 14, and a mating seal 16, from a top plan view. The locking structures 12, 14 are generally configured to be hermaphroditic, so that every gladhand coupler 10 may lock together with any other gladhand coupler. The mating seal 16 is fabricated from rubber or a rubber-like material, such as silicone, capable of being compressed. In ordinary operation, two gladhand couplers are secured to hoses, and then locked together by aligning the mating seals and then locking the locking structures together with a relative rotation of one gladhand with respect to the other about the aligned seal axes, the seal axes being the respective axes through the apertures of the mating seals and orthogonal to the plane of the mating seals of the respective gladhand couplers. When locked together, the mating seals are compressed against each other, forming an air-tight seal which allows fluids to pass from one hose through the couplers and through the other hose. The air-tight seal further prevents the leaking of fluid between the couplers.

FIG. 1B illustrates the exemplary embodiment of the gladhand coupler 10, its first and second locking structures 12, 14, and its mating seal 16, from a cross-sectional view. The spatial relationship of the parts is further depicted, though it will be understood that the figure is not drawn to scale, and does not necessarily show the precise sizes and spatial configuration of the components.

FIG. 2 illustrates the gladhand coupler 10 and a gladhand coupler assembly 100 of one embodiment of the present disclosure coupled together. Also illustrated is a trailer obstruction keep out zone 40. The gladhand coupler and its locking structures 12, 14, and the gladhand coupler assembly are shown in an engaged position, and are further shown outside the trailer obstruction keep out zone 40. In the engaged position, the locking structures of the gladhand coupler 12, 14 and gladhand coupler assembly 112, 114 rigidly couple the gladhand coupler 10 and gladhand coupler assembly 100 together.

The trailer obstruction keep out zone 40 is a region of space that may contain obstructions with which the gladhand coupler assembly should not interfere, which is associated with a trailer. A trailer can be any type of vehicle, cart, wagon, or other device configured to be coupled with a pulling vehicle. An idiomatic example of a trailer is the semi-trailer, which is the type of trailer commonly used by tractor units to haul cargo on highways. The typical semi-trailer has many connections, for example, electrical connections to provide power to lights located within the trailer or to brake lights on the rear of the trailer, and sometimes multiple gladhand couplers. Many semi-trailers will also have other components mounted in various places. It is desirable to avoid interfering with these components and connections to avoid disconnecting, damaging, or preventing access to them. Therefore, it is desirable to define regions of space which the gladhand coupler assembly should not enter, those regions being regions containing other connections or equipment, or being regions for which it is desirable that the gladhand coupler assembly stay clear of.

In one embodiment of the disclosure, the gladhand coupler assembly is configured so that it can avoid obstructions on the trailer face, the truck bed, and in other places, so that it does not interfere with other objects. These regions of space, which the gladhand coupler assembly is designed to avoid, are keep out zones. In these embodiments of the disclosure, it is desirable that the gladhand coupler assembly be configured such that the likelihood of entering a keep out zone is minimized. In at least one embodiment of the disclosure, the gladhand coupler assembly may avoid keep out zones by eliminating the need to use a twisting motion in the plane of the gladhand coupler mating seal to lock the gladhand coupler assembly and gladhand coupler together.

FIG. 3 shows the coupler 10 having an area of engagement 50, which in one embodiment can be a 90-degree rotation for an ordinary gladhand coupler when attached to trailer-side gladhand couplers or, more generally, when one gladhand coupler is attached to another gladhand coupler. In some embodiments of the present disclosure, neither the gladhand coupler assembly 100 nor the gladhand coupler 10 need to rotate at all to couple with each other. The provision of not requiring relative rotation in the plane of the gladhand coupler mating seal affords many advantages, including, in at least one embodiment of the disclosure, reducing the chances that the gladhand coupler assembly enters a keep out zone by reducing the total volume through which the gladhand coupler assembly must move to couple with the gladhand coupler. Eliminating the need to rotate the gladhand coupler assembly also reduces the wear-and-tear on the mating seals of both the gladhand coupler assembly and gladhand coupler, thereby extending the useful lifespan of these objects.

Figure 4:
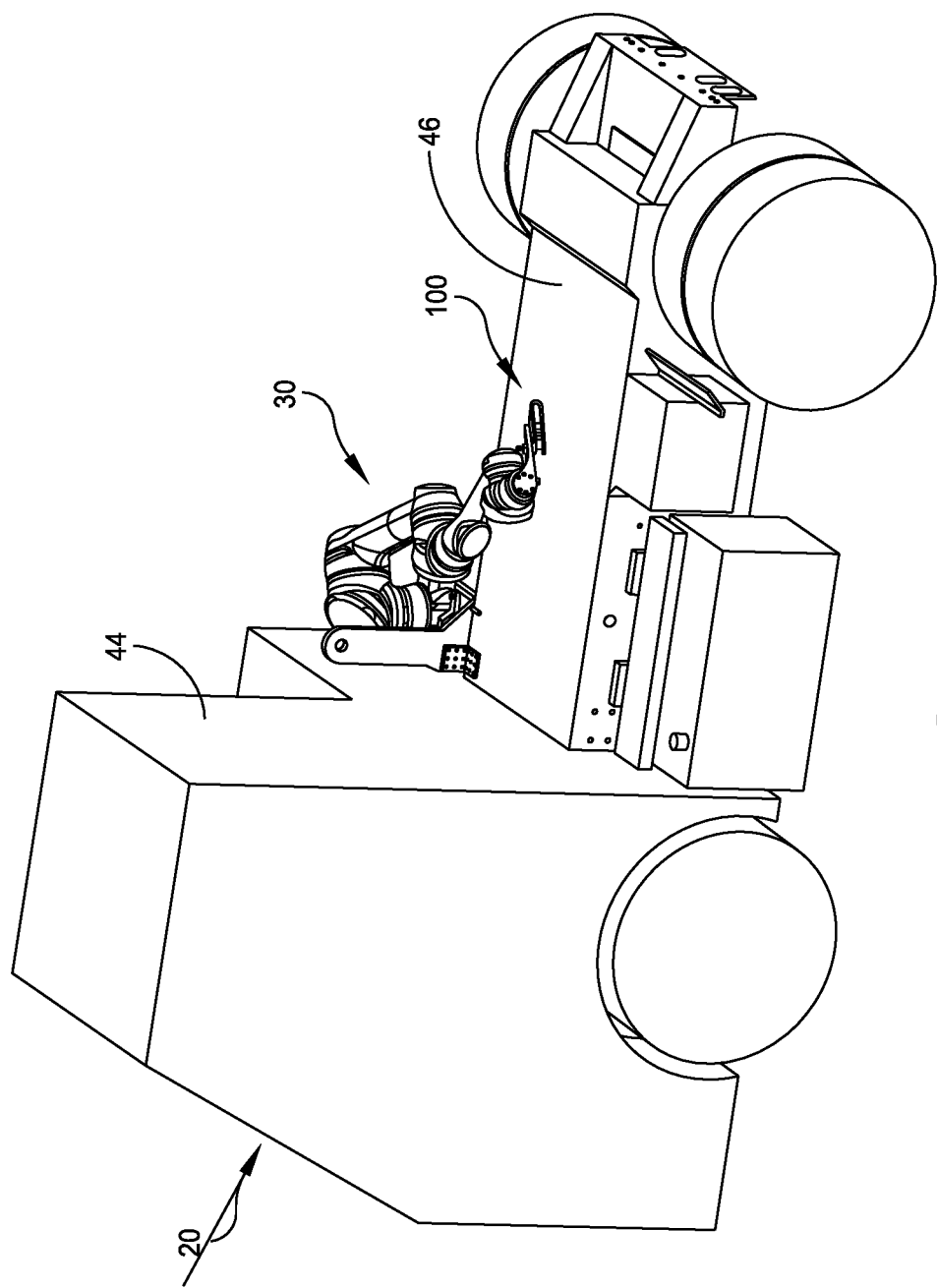
FIG. 4 is a perspective view of a truck including a multi-axis robotic arm configured to position the gladhand coupler assembly.

Referring to FIG. 4, one possible embodiment of the gladhand coupler assembly 100 is shown to be connected to a robotic arm 30, with the robotic arm being connected to the back of a truck 20. The truck may be a yard truck, like those used to move trailers within distribution facilities, ports, and so forth, or any other type of tractor unit. It will be understood that any means of moving the gladhand coupler assembly to achieve the engaged or mating position with the gladhand coupler, such as a different type of robot, a person, or any other automated, semi-automated, or non-automated means, may also be used. The robotic arm or equivalent may be configured to allow the gladhand coupler assembly 100 to avoid any keep out zones, such as the trailer keep out zone 40, or those of the backside of the truck's cab 44, the truck bed 46, or elsewhere around the gladhand coupler assembly. It will also be appreciated that the robotic arm or equivalent may also be autonomous, semi-autonomous, or manually operated. It will be further appreciated that the robotic arm or equivalent need not be connected to the back of the truck, but may be connected to other parts of the truck, or to other mobile or immobile platforms, including—but not limited to—other cars or trucks, cranes, the ground, or any other appropriate place.

It will also be understood that the robotic arm 30 or equivalent may be configured to release the gladhand coupler assembly 100 after coupling the gladhand coupler assembly 100 to the gladhand coupler 10.

Figure 5:
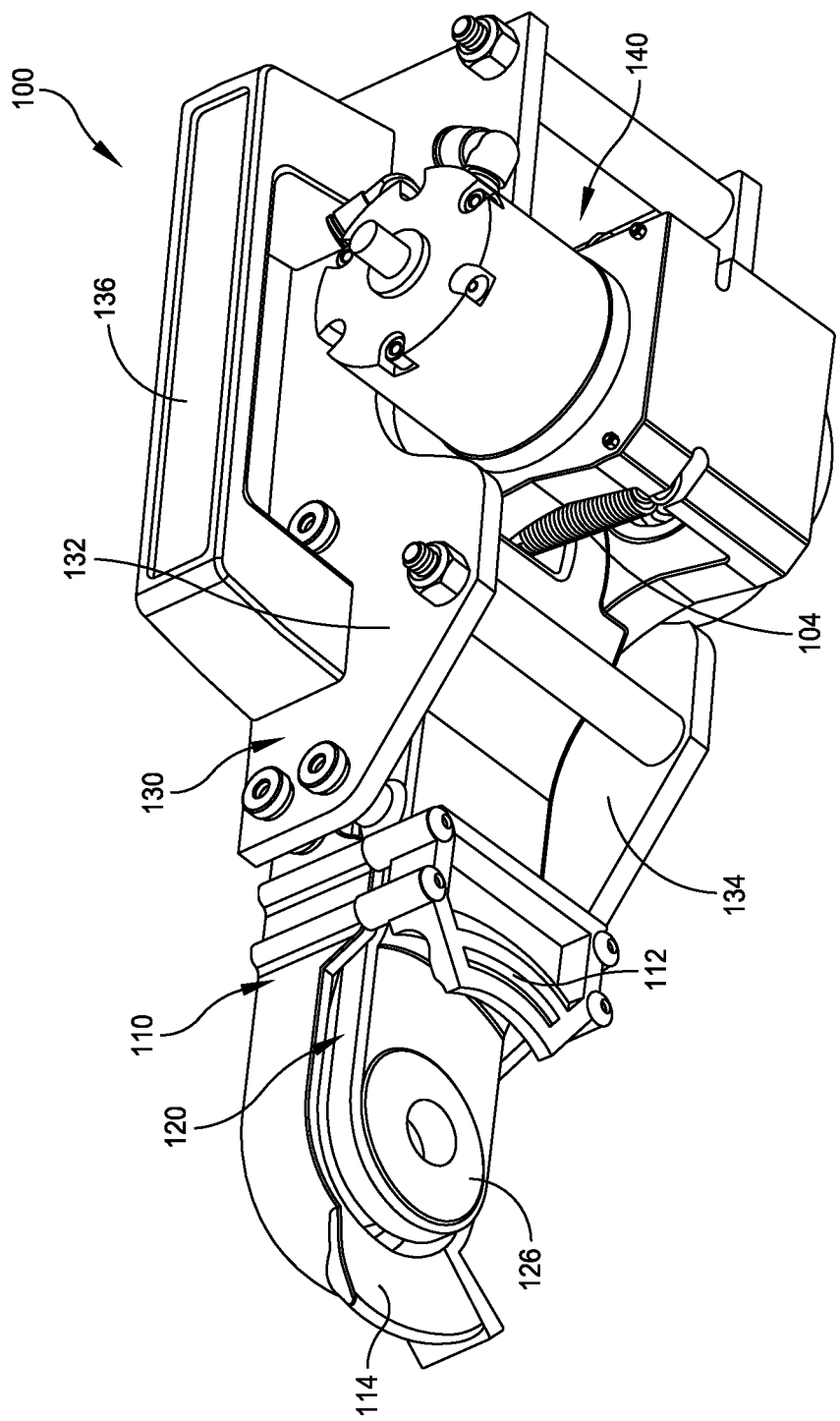
FIG. 5 is a perspective view of a gladhand coupler assembly of one embodiment of the present disclosure.

Referring to FIG. 5, one embodiment of the gladhand coupler assembly is generally indicated at 100. In this embodiment, the gladhand coupler assembly 100 is configured to releasably couple to the gladhand coupler 10. As shown, the gladhand coupler assembly 100 includes a bracket, generally indicated at 130, which may have one or more bracket portions and is shown with first and second bracket portions 132, 134; a coupler support, generally indicated at 110, secured to the bracket 130; a coupler arm, generally indicated at 120, which is pivotably connected to the bracket 130; and a motor assembly, generally indicated at 140, which is secured to the coupler support 110. In some embodiments, the motor assembly 140 may be referred to generally as an actuation mechanism. The coupler arm 120 includes a mating seal 126, which pivots via the coupler arm relative to the coupler support 110, and, when in fluid communication with the mating seal 16 of the gladhand coupler 10, allows fluids to flow through an aperture formed in the mating seal. The coupler arm 120 is pivotably coupled to bracket 130. the coupler support 110 is rigidly coupled to bracket 130. This arrangement allows relative pivotal movement between the coupler arm 120 and the coupler support 110. The coupler support 110 includes a first locking structure 112 that is secured to the coupler support 110 and a second locking structure 114 provided at one end of the coupler support 110. As shown, the locking structure 114 and the coupler support 110 are formed of a single piece, and locking structure 112 is coupled to the coupler support 110. However, it will be understood that all three elements could be formed as a single piece or as separate pieces, or as a combination of separate and single pieces. The first locking structure 112 is secured to the coupler support 110 at a place where the spatial relationship of the first locking structure 112 and the second locking structure 114 is configured to allow coupling of the gladhand coupler assembly 100 with the gladhand coupler 10. In at least one embodiment, the spatial relationship of the first and second locking structures 112, 114 is consistent with the SAE J318 standard. The gladhand coupler assembly may also use one or more springs 104, which are discussed in greater detail below. A handle 136 may also be coupled to the bracket 130 or any of the bracket portions, and the bracket or its bracket portions may be configured to be coupled to external devices, such as a robotic arm.

Figure 6:
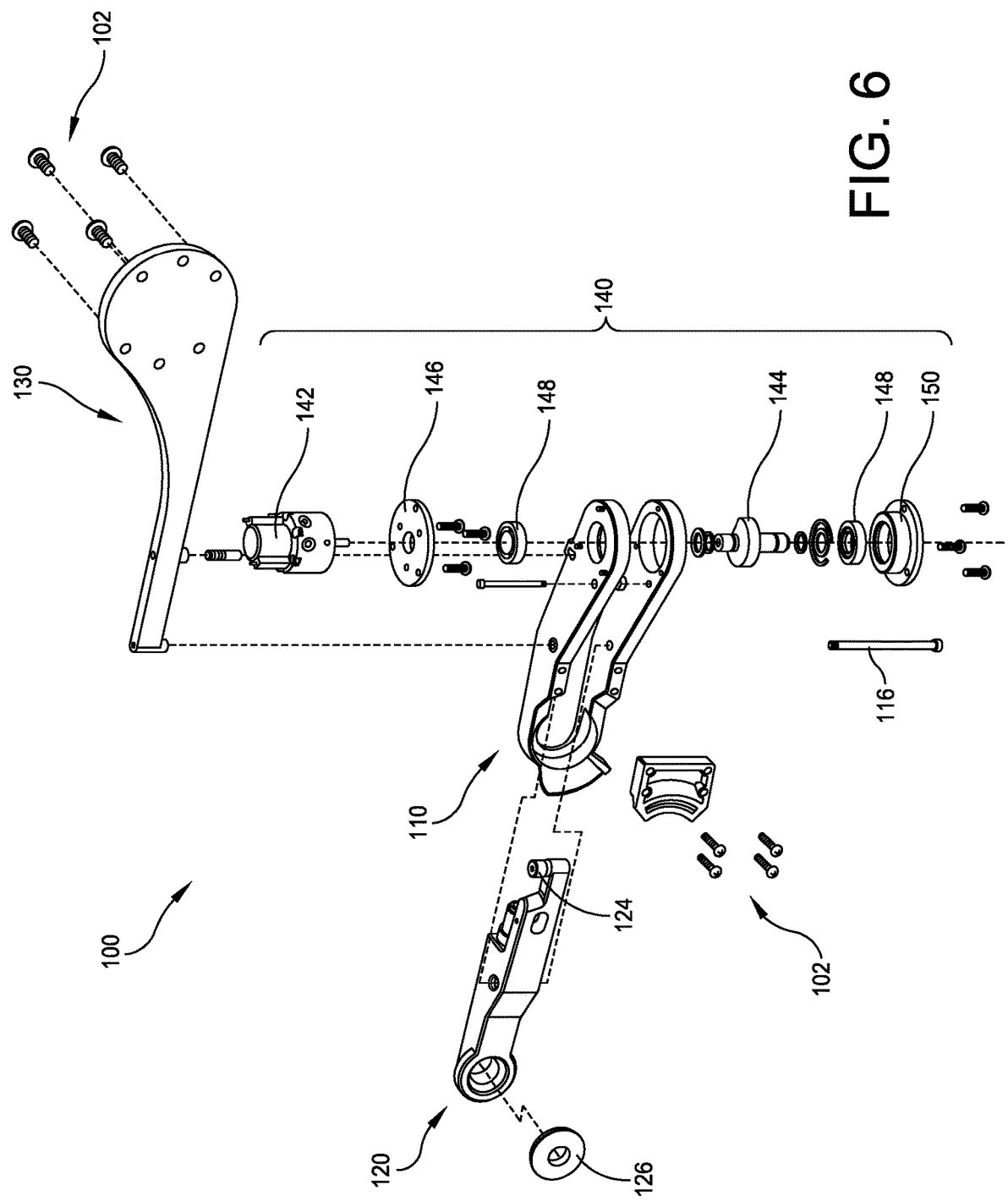
FIG. 6 is an exploded perspective view of the gladhand coupler assembly shown in FIG. 5.

Referring additionally to FIG. 6, the motor assembly 140 includes a motor 142 and a cam 144 that is driven by the motor. The motor assembly 140 further includes a plate 146, bearings, each indicated at 148, and an annular mounting ring 150 that are assembled to secure the motor to the coupler support 110. The coupler arm 120 includes at an end opposite the mating seal 126 a cam follower 124, which is configured to follow the cam 144 of the motor assembly 140 when assembled. The cam 144 and the cam follower 124 are configured to move the mating surface 126 between a distal position (sometimes referred to as a "first" position) in which the mating surface of the gladhand coupler assembly is spaced from the mating surface 16 of the gladhand coupler 10 and an engaged or mating position (sometimes referred to as a "second" position) in which the mating surface 126 of the gladhand coupler assembly 100 sealingly engages the mating surface 16 of the gladhand coupler 10. A first spring 104 (FIG. 8A) may be secured to the coupler support 110 and the cam follower 124 of the coupler arm 120. A second spring 106 (FIG. 8A) may be secured to the coupler support 110 and the bracket 130, which will be shown and described in greater detail below, coupled between the coupler support 110 and the bracket 130. The purpose of the spring 104 is to bias the coupler arm 120 so that the mating surface 126 is maintained in the distal position. The purpose of the spring 106 is to maintain the coupler arm 120 and the coupler support 110 in a pitched counterclockwise position. Spring 106 allows the gladhand coupler assembly 100 to switch to the engaged position without generating excessive force, and allows the gladhand coupler assembly 100 to drive into the gladhand coupler 10 without causing damage. However, it will be understood that equivalent, springless systems exist and are covered by this disclosure.

In at least one embodiment, the cam 144 is configured to lock the coupler arm 120 in place when the gladhand coupler assembly 100 is coupled to a gladhand coupler 10. The locking of the coupler arm 120 in place prevents the mating surface 126 of the gladhand coupler assembly 100 from disengaging from the mating surface 16 of the gladhand coupler 10. The gladhand coupler assembly is designed to maintain the locked position with no active power provided to the motor 142 of the motor assembly 140. Specifically, the motor 142 is coupled to the cam 144 to control rotation of the cam, and may be used to actuate the assembly. However, any suitable equivalent to the motor shown and described herein may also be used.

Various fasteners 102 are also shown, and may be of any appropriate type, such as screws, nails, bolts, nuts, hooks, washers, or rivets, or any other securing member appropriate for the task. A pivot pin 116 may be used to pivotably secure the coupler arm 120 and coupler support 110 together.

It should be understood that the motor 142 of the motor assembly 140 is configured to lock the mechanical linkage in place without having to maintain power to the motor to maintain the mating seal 126 of the gladhand coupler assembly 100 in fluid communication with the mating seal 16 of the gladhand coupler 10. The constituent parts including the cam 144 and the cam follower 124, and the components that support the cam and cam follower, may be referred to herein as a mechanical linkage, as may the 4-bar link or any other mechanical system used to constrain relative motion of the system.

Figure 7A:
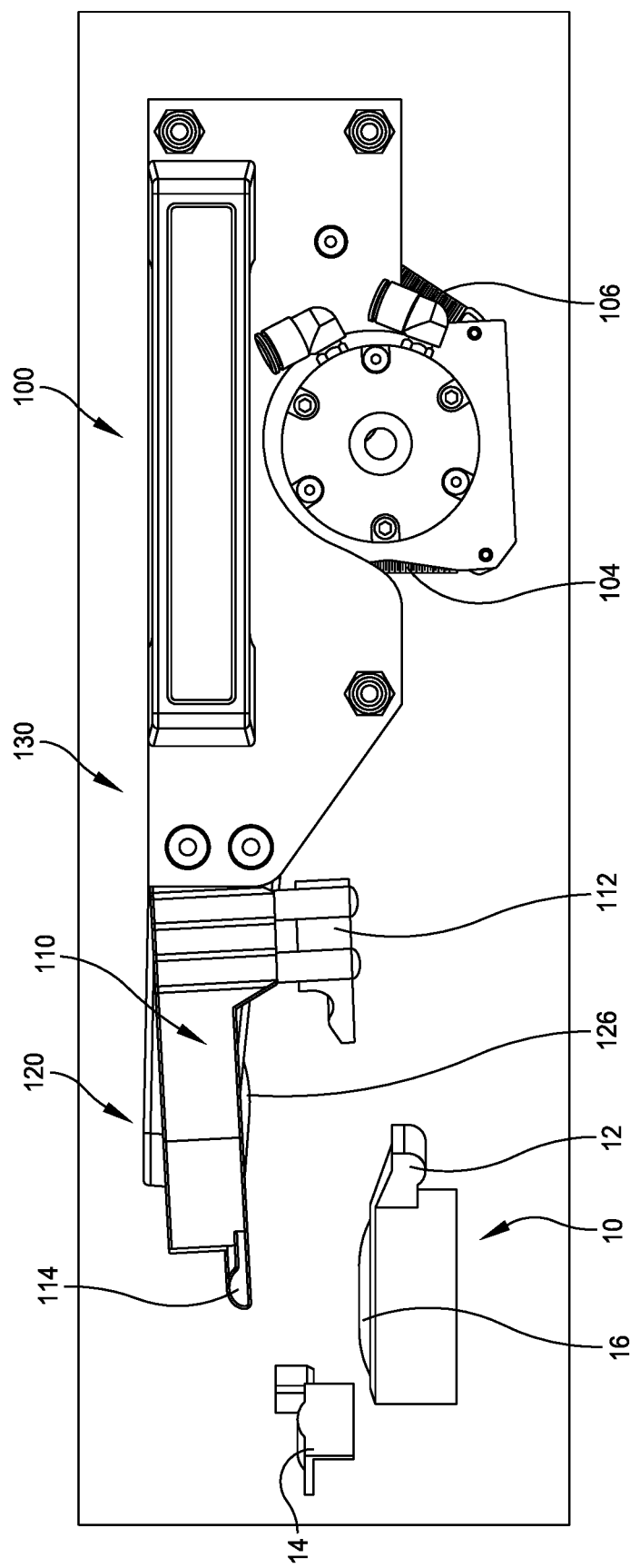
FIGS. 7A-7D are a side views of the gladhand coupler assembly and the gladhand coupler showing a sequence of movement of the gladhand coupler assembly when securing the gladhand coupler assembly to the gladhand coupler.
Figure 7B:
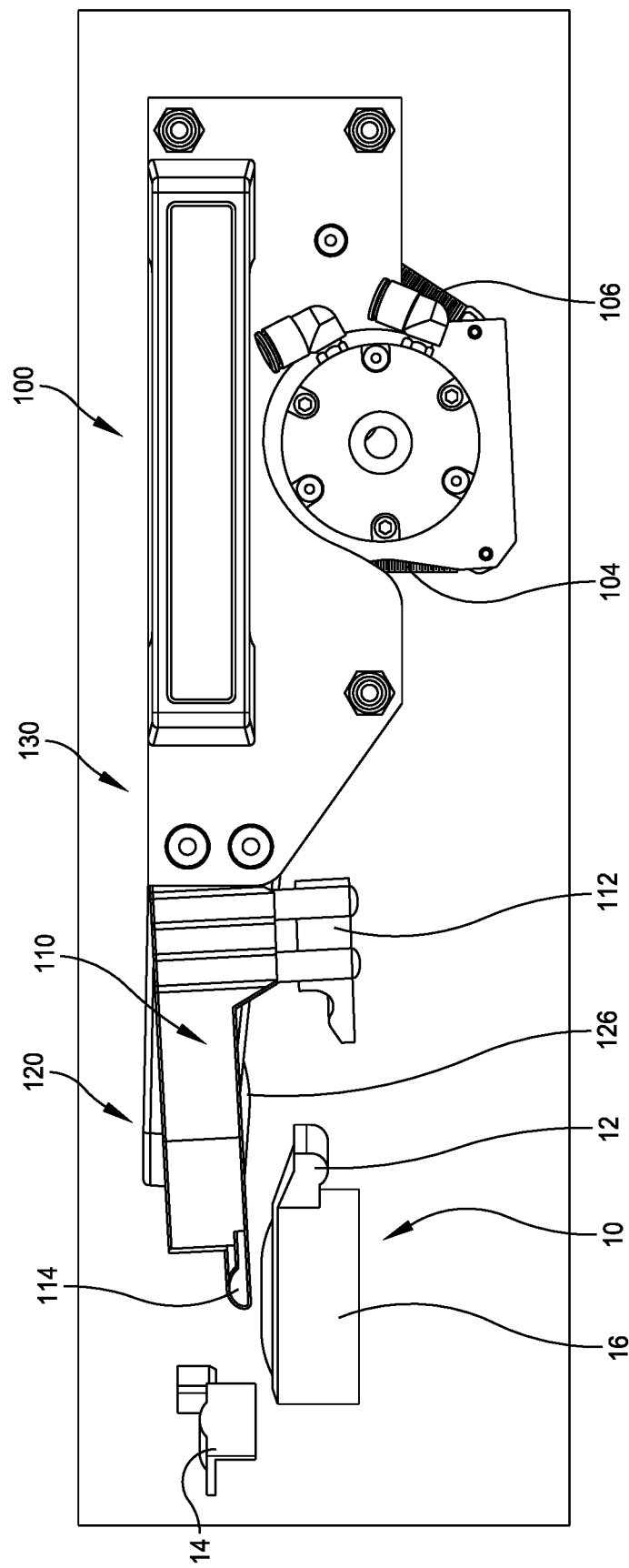
Figure 7C:
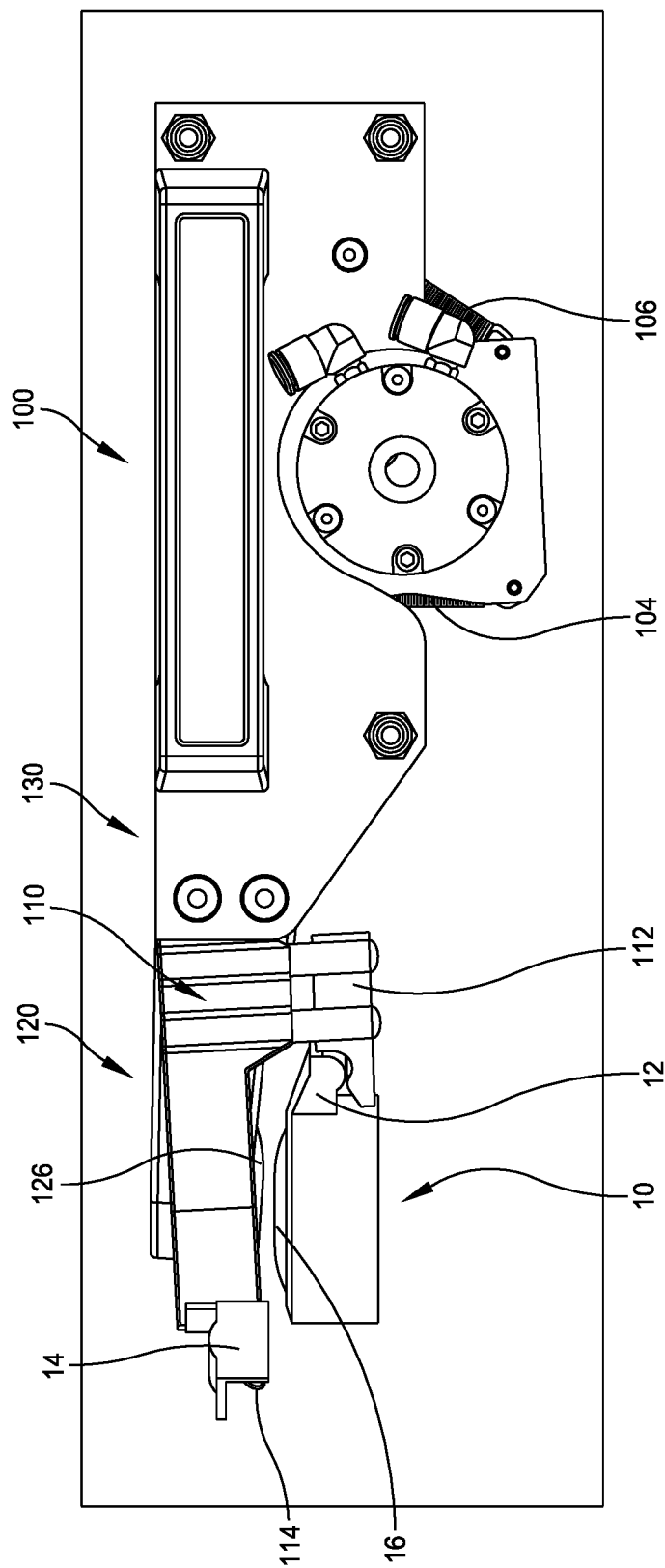
Figure 7D:
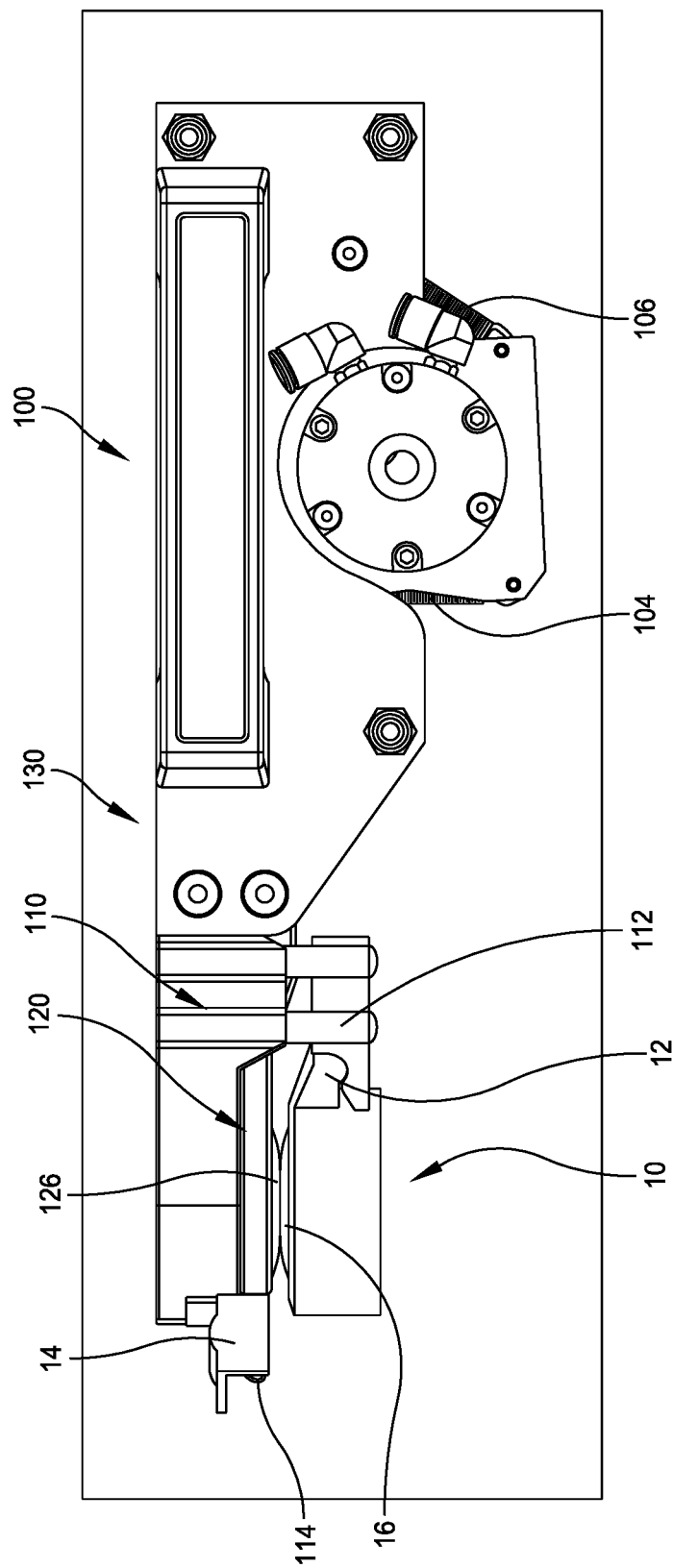

Referring to FIGS. 7A-7D, a sequence of operation of the gladhand coupler assembly 100 is illustrated. It will be noted that FIGS. 7A-7C show the gladhand coupler assembly in the distal position configured to receive a gladhand coupler 10, and FIG. 7D shows the gladhand coupler assembly in the engaged or locked position, releasably secured to the gladhand coupler. In the distal or first position, the coupler support 110 and the first 112 and second 114 locking structures are angled relative to the angle of the coupler arm 120. It will be appreciated that, in the first position, the second locking structure acts 114 as a guide to assist an operator or the robotic arm 30 in positioning the gladhand coupler assembly 100 with respect to the gladhand coupler 10. With the coupler arm 120 somewhat protected by the coupler support 110, the gladhand coupler assembly 100 can be manipulated over the mating surface 16 of the gladhand coupler 10 with little or no risk that the mating surface 126 of the gladhand coupler assembly 100 will inadvertently engage or otherwise damage the mating surface 16 of the gladhand coupler 10 during this positioning process. This configuration allows the gladhand coupler assembly 100 to approach the gladhand coupler 10 directly, and to releasably couple without requiring any rotational or twisting motion of the gladhand coupler 10 and/or the gladhand coupler assembly 100.

FIGS. 7A-7D further illustrate one example by which the gladhand coupler assembly 100 may approach the gladhand coupler 10. The gladhand coupler assembly may approach the gladhand coupler directly or indirectly, and may be aligned or misaligned within tolerances. During such an approach, the mating seal 126 of the gladhand coupler assembly 100 will not contact the mating seal 16 of the gladhand coupler, until contact is made between the locking structures 12, 112 and locking structures 14, 114, respectively, and the system is actuated to move the mating seals 16, 126 to the engaged or second position.

FIG. 7A shows the gladhand coupler assembly 100 and gladhand coupler 10 separated from one another and not in position for approach. The distances and scales depicted are not exact, and should be taken as illustrative rather than definitive.

FIG. 7B shows the gladhand coupler assembly 100 positioned to approach the gladhand coupler 10. It will be noted that, if the gladhand coupler assembly 100 were lowered, the second locking structure 114 would act as a guide, preventing contact between the mating seals 16, 126 of the gladhand coupler 10 and gladhand coupler assembly 100, respectively. To engage with the gladhand coupler 10, the gladhand coupler assembly 100 must move toward the gladhand coupler, until contact is made.

FIG. 7C shows that gladhand coupler assembly 100 after it has contacted the gladhand coupler 10 and is in position to engage and lock together with the gladhand coupler. It can be observed that locking feature 114 of the gladhand coupler assembly 100 can be in contact with the locking feature 14 of gladhand coupler 10 and locking feature 112 can be in contact with locking feature 12, without seals 16 and 126 contacting each other.

FIG. 7D shows the gladhand coupler assembly 100 releasably secured, in the engaged or second position, to the gladhand coupler 10. In the second position it will be noted that the angle between the coupler arm 120 and the coupler support 110 is minimized. The angle may be reduced to zero, or may be any other suitably small angle. It will also be noted that the mating seals 16, 126, of the gladhand coupler 10 and the gladhand coupler assembly 100 are now secured together in fluid communication, allowing the passage of fluid through each other.

The gladhand coupler assembly 100 is configured to allow for some angular misalignment with the mating surface 16 of the gladhand coupler 10. Specifically, as described above, the coupler support 110 and the coupler arm 120 are configured to rotate with respect to the bracket 130 through a small angle to provide a degree of movement. This structure prevents binding when moving to the engaged or locked position. For example, if the robotic arm 30 (not shown) is misaligned with the gladhand coupler 10, the parts of the gladhand coupler assembly 100 can rotate about respective pivots to the bracket 130.

Figure 8A:
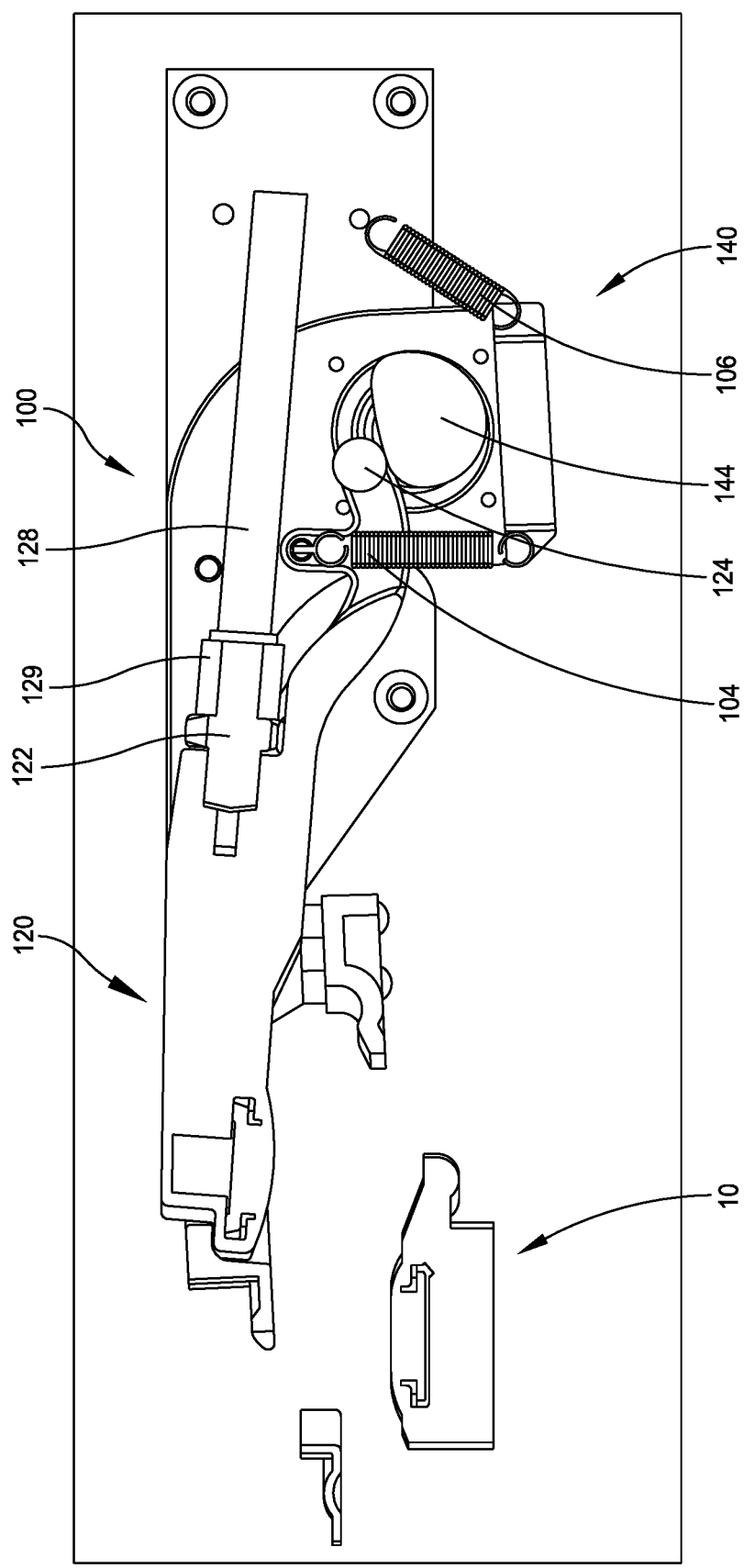
FIGS. 8A-8D are partial cross-sectional views of the gladhand coupler assembly and the gladhand coupler showing the sequence of movements of the gladhand coupler assembly shown in FIGS. 7A-7D.
Figure 8B:
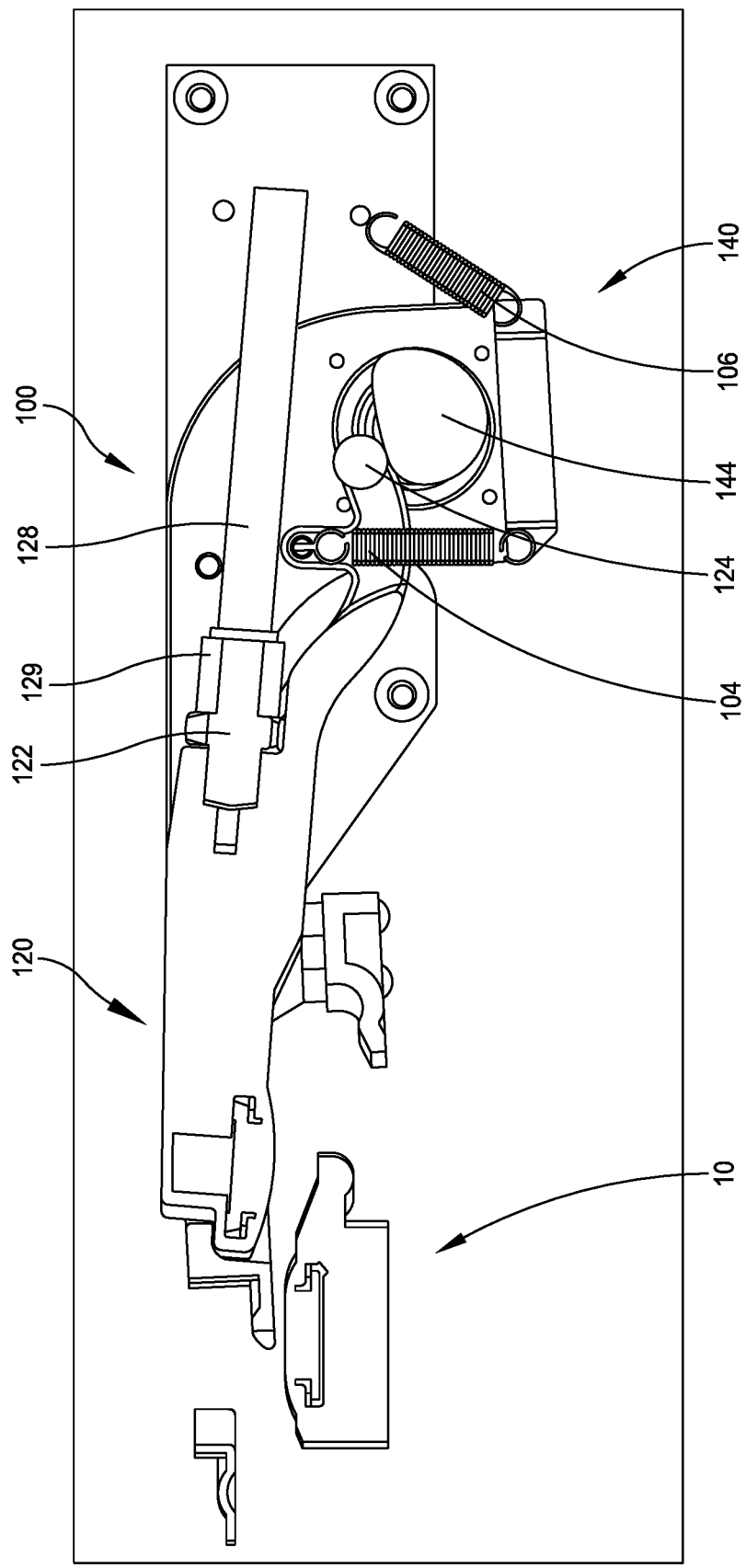
Figure 8C:
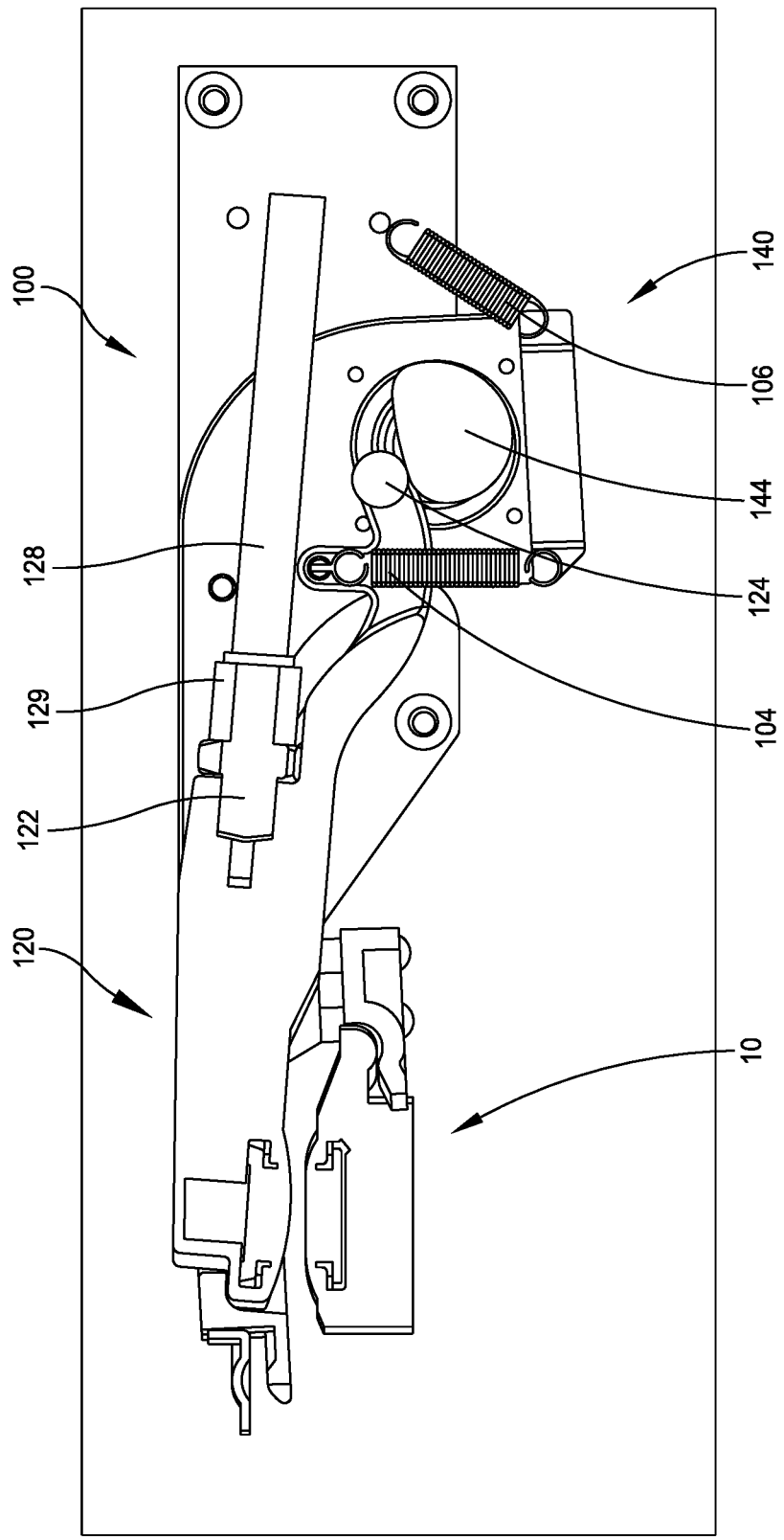
Figure 8D:
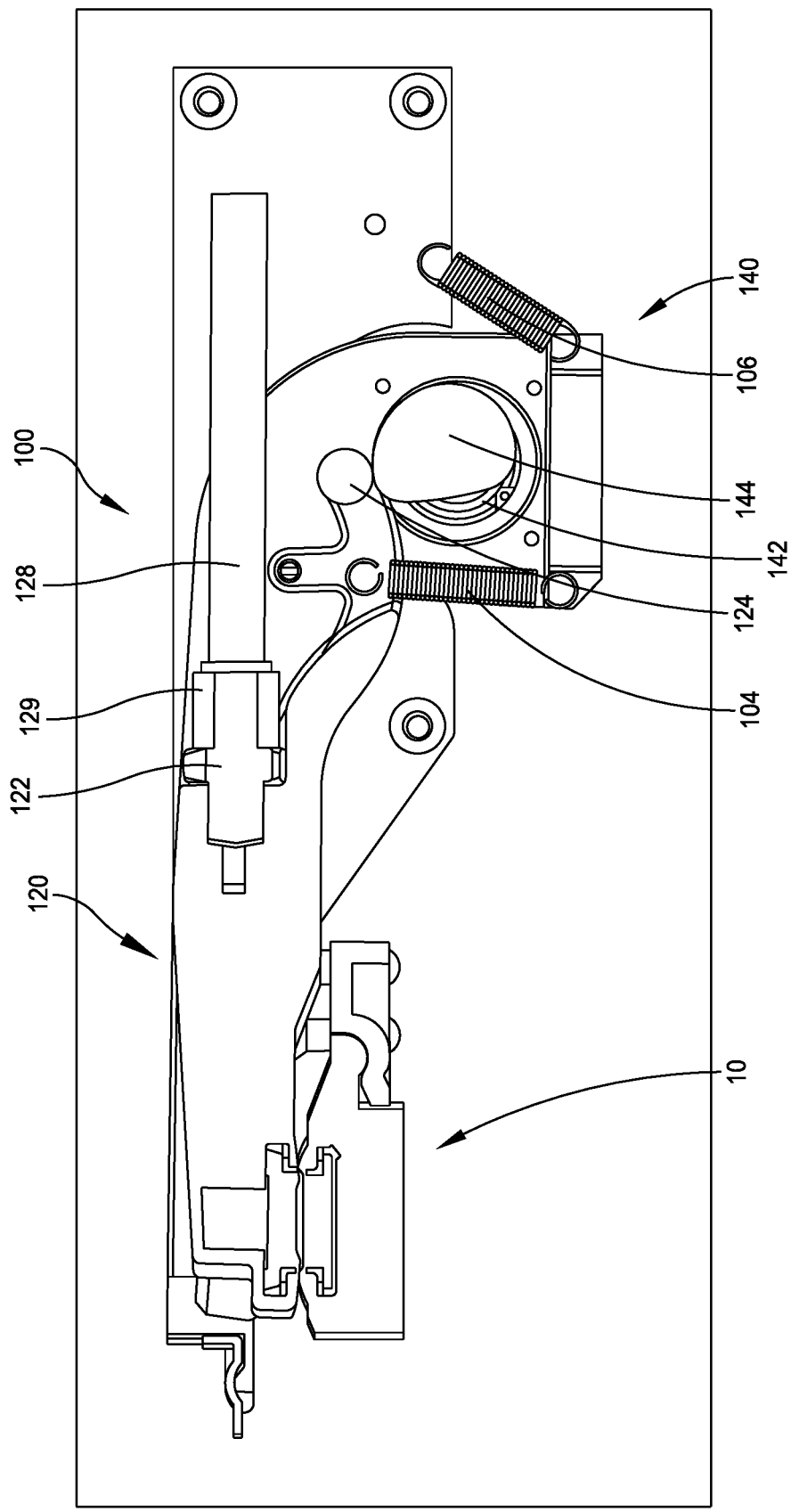

FIGS. 8A-8D illustrate a partial cross-sectional of the gladhand coupler 10 and the gladhand coupler assembly 100, with the same method of coupling the gladhand coupler assembly to the gladhand coupler that is shown in FIGS. 7A-7D. FIGS. 8A-8C show the gladhand coupler assembly 100 in the distal or first position with respect to the gladhand coupler 10. FIG. 8D shows the gladhand coupler assembly in the engaged or second position with respect to the gladhand coupler 10.

FIG. 8A shows the gladhand coupler assembly 100 in the distal or first position, configured to receive a gladhand coupler 10, but not positioned to approach the gladhand coupler. As shown, the coupler arm 120 includes a line 122 connected to a pneumatic source 128 by a connector 129 to provide fluid communication from the pneumatic source to the port of the mating surface 126. The cam 144 of the motor assembly 140 is positioned in an unlocked position, with a flat surface of the cam engaging the cam follower 124.

FIG. 8B shows the gladhand coupler assembly 100 ready to approach the gladhand coupler 10 as shown in FIG. 7B. The cam 144 remains in an unlocked position.

FIG. 8C shows the gladhand coupler assembly 100 after it has contacted the gladhand coupler 10 and is in position to engage and lock together with the gladhand coupler.

FIG. 8D shows the gladhand coupler assembly 100 in the engaged or second position. The cam 144 is configured in a locked position, which prevents the gladhand coupler assembly 100 from releasing the gladhand coupler 10 until the motor 142 is engaged to rotate the cam 144. As shown, the cam 144 of the motor assembly 140 is positioned in a locked position, with a high surface of the cam engaging the cam follower 124.

Figure 9A:
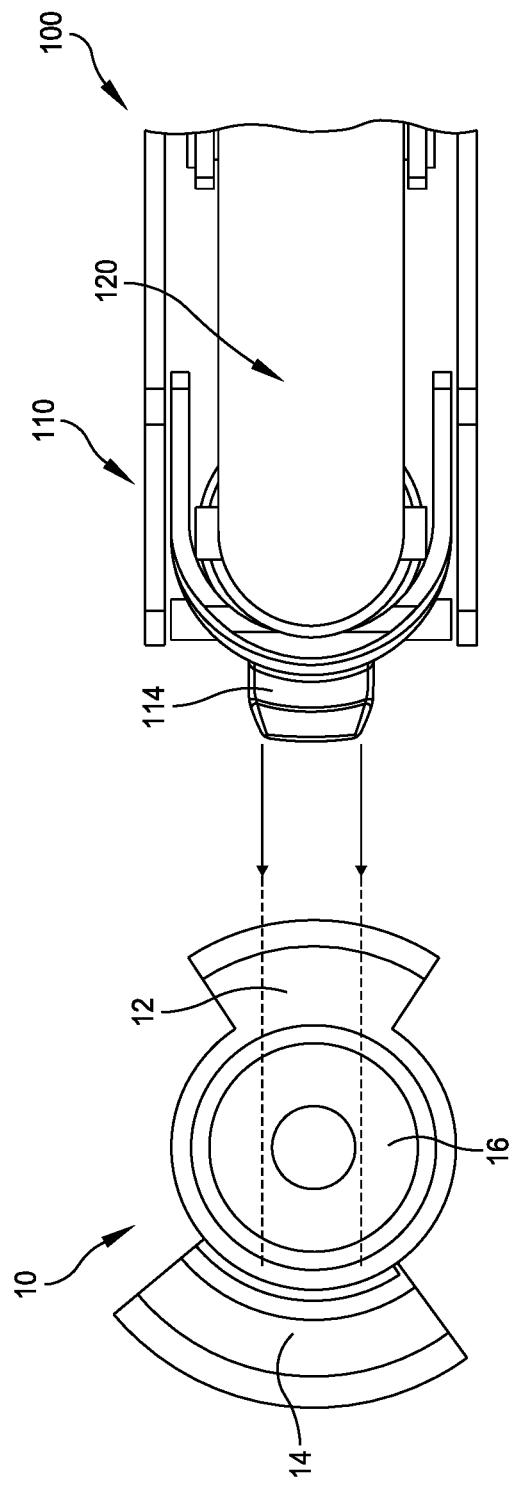
FIG. 9A is a top plan view of the gladhand coupler assembly and the gladhand coupler prior to securing the gladhand coupler assembly to the gladhand coupler.

Referring to FIG. 9A, one possible method for operating the gladhand coupler assembly is shown. In one embodiment, the gladhand coupler assembly 100 approaches the gladhand coupler 10 in the distal or first position. It will be appreciated that the coupler arm 120 is in a raised position relative to the mating seal 16 of the gladhand coupler 10, thus preventing any abrasion or contact between the mating seal of the gladhand coupler or the coupler arm 120 and/or the mating seal 126 associated with the coupler arm 120. It will also be appreciated that the gladhand coupler assembly 100, though shown to approach directly in such a manner as to bisect the second locking structure 14 of the gladhand coupler 10, may actually approach in an indirect manner, such that small misalignments of the respective locking structures and mating seals of the gladhand coupler assembly and the gladhand coupler is tolerated.

Figure 9B:
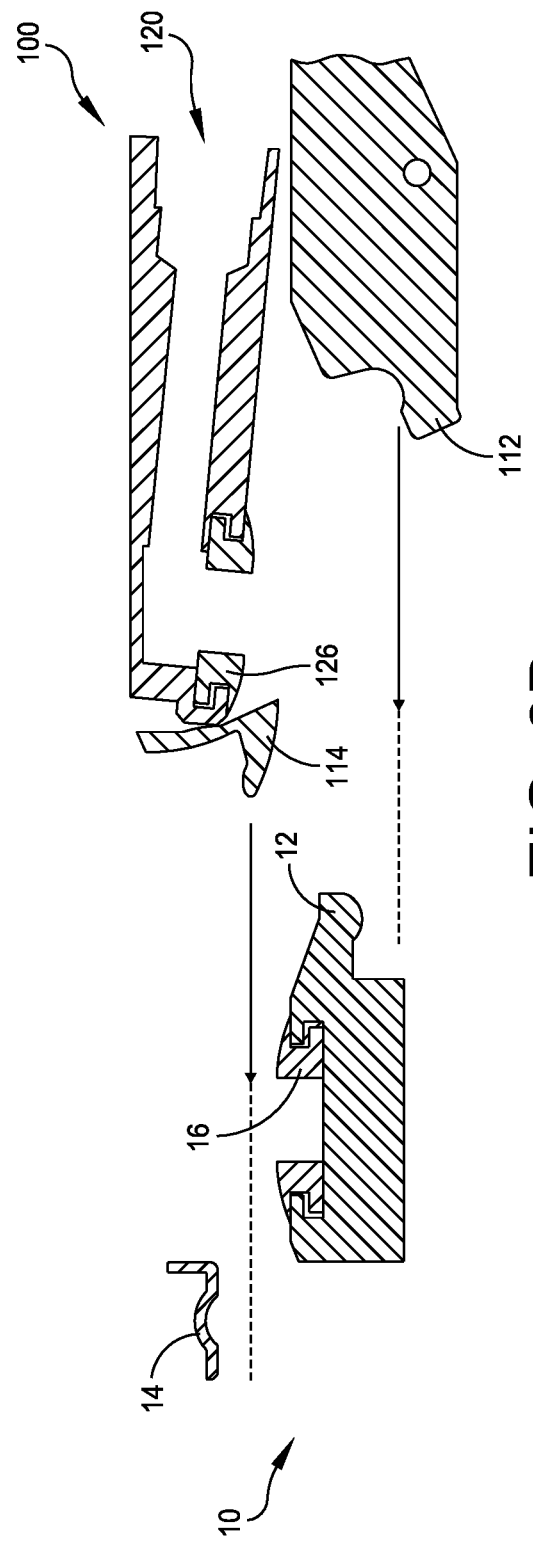
FIG. 9B is a cross-sectional view of the gladhand coupler assembly and the gladhand coupler shown in FIG. 9A.

FIGS. 9A and 9B illustrate the first locking structure 112 and the second locking structure 114 of the gladhand coupler assembly 100 approaching the first locking structure 12 and the second locking structure 14 of the gladhand coupler 10, respectively, with the first locking structure of the gladhand coupler assembly being offset with respect to the second locking structure of the gladhand coupler assembly. The second locking structure 114 of the gladhand coupler assembly 100 is articulated by the coupler support 110, allowing the second locking structure to move underneath the second locking structure 14 of the gladhand coupler 10 while not rotating the gladhand coupler assembly. The second locking structure 114 of the gladhand coupler assembly 100 further may act as a guide to assist in moving the gladhand coupler assembly toward the gladhand coupler 10 and to prevent accidental contact between the mating seals 16, 126 of the gladhand coupler and gladhand coupler assembly, respectively. The second locking structure 114 of the gladhand coupler assembly 100 may also be rounded on the end and tailored to fit past an obstruction on the second locking structure 14 of the gladhand coupler 10.

FIGS. 10A and 10B show the gladhand coupler assembly 100 advancing toward the gladhand coupler 10 until the locking structures 112, 114 of the gladhand coupler assembly contacts the locking structures 12, 14 of the gladhand coupler, respectively, which is illustrated in by the dashed lines. As shown, the gladhand coupler assembly 100 contacts the gladhand coupler 10, with the mating seals 126, 16 of the respective gladhand coupler assembly and the gladhand coupler being spaced from one another in the distal or first position. It will also be noted that the locking structures 112, 114 of the gladhand coupler assembly 100 and the locking structures 12, 14 of the gladhand coupler 10 are in a position to lock together. In this position, small misalignments of the gladhand coupler assembly 100 and gladhand coupler 10 are tolerated without impact the function of the assembly. This configuration allows the gladhand coupler assembly 100 to approach the gladhand coupler 10 without the mating seals 126, 16 contacting each other, respectively, until the gladhand coupler assembly is engaged to the gladhand coupler in the second position.

Figure 11A:
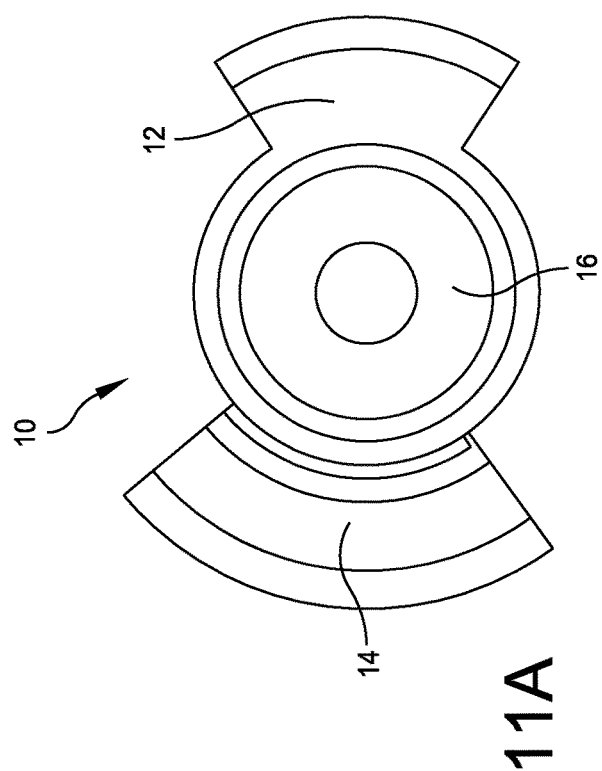
FIG. 11A is a top plan view of the gladhand coupler.
Figure 11B:
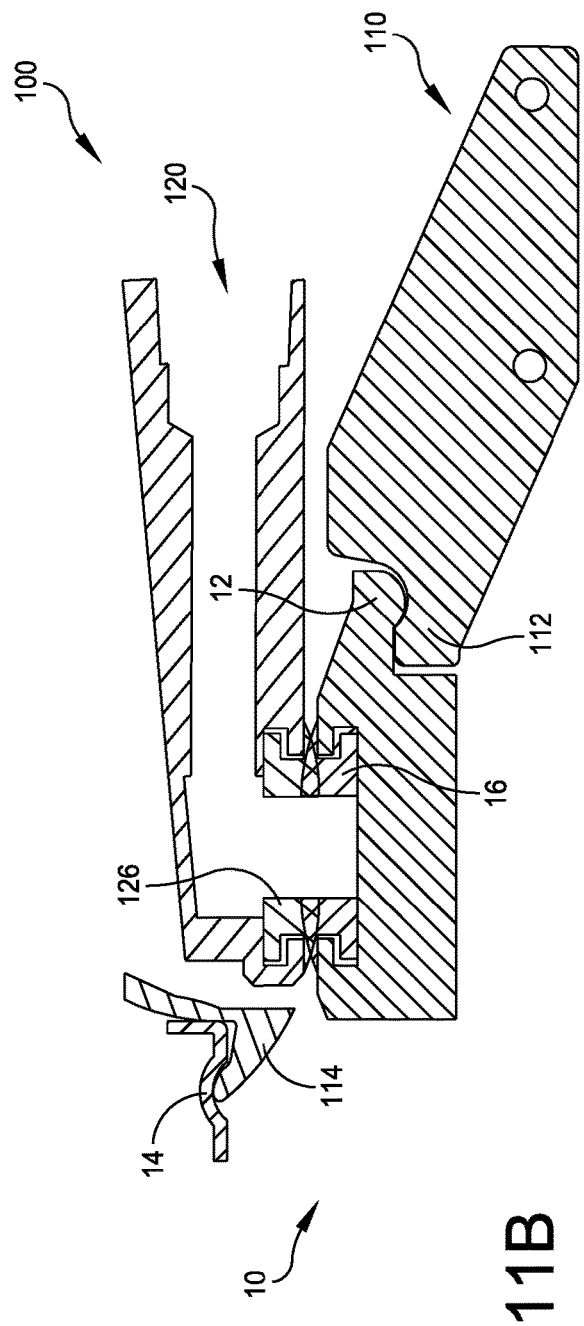
FIG. 11B is a cross-sectional view of the gladhand coupler assembly and the gladhand coupler with the gladhand coupler assembly secured to the gladhand coupler.

FIGS. 11A and 11B illustrate the gladhand coupler assembly 100 in the mating or second position with the gladhand coupler 10. In this position, the mating seal 126 of the gladhand coupler assembly 100 and the mating seal 16 of the gladhand coupler 10 are in contact, creating a sealed passage which allows fluids to flow through the pneumatic line 122 of the gladhand coupler assembly through the respective mating seals and through the gladhand coupler. In one example, the gladhand coupler 10 may be connected to a pneumatic braking system. The flow of fluids is preferably from the gladhand coupler assembly 100 to the gladhand coupler 10; however, the flow can be provided in reverse, from the gladhand coupler to the gladhand coupler assembly. The locking structures 12, 14, 112, 114 of the gladhand coupler 10 and the gladhand coupler assembly 100, respectively, are fully engaged in this position, which prevents the gladhand coupler assembly from disengaging from the gladhand coupler, and generally prevents the decoupling of the parts. The transition from the first position to the second position does not require any relative rotational movement of the gladhand coupler assembly 100 with respect to the plane of the mating seal 16 of the gladhand coupler 10.

As shown and described, the first and second locking structures 112, 114 of the gladhand coupler assembly 100 are rigidly fixed to each other so as to limit independent motion of the first assembly locking structure 112 relative to the second assembly locking structure 114. The first and second locking structures 112, 114 are rigidly coupled to each other so that they essentially act as if they are part of a single, unitary structure.

Figure 12A:
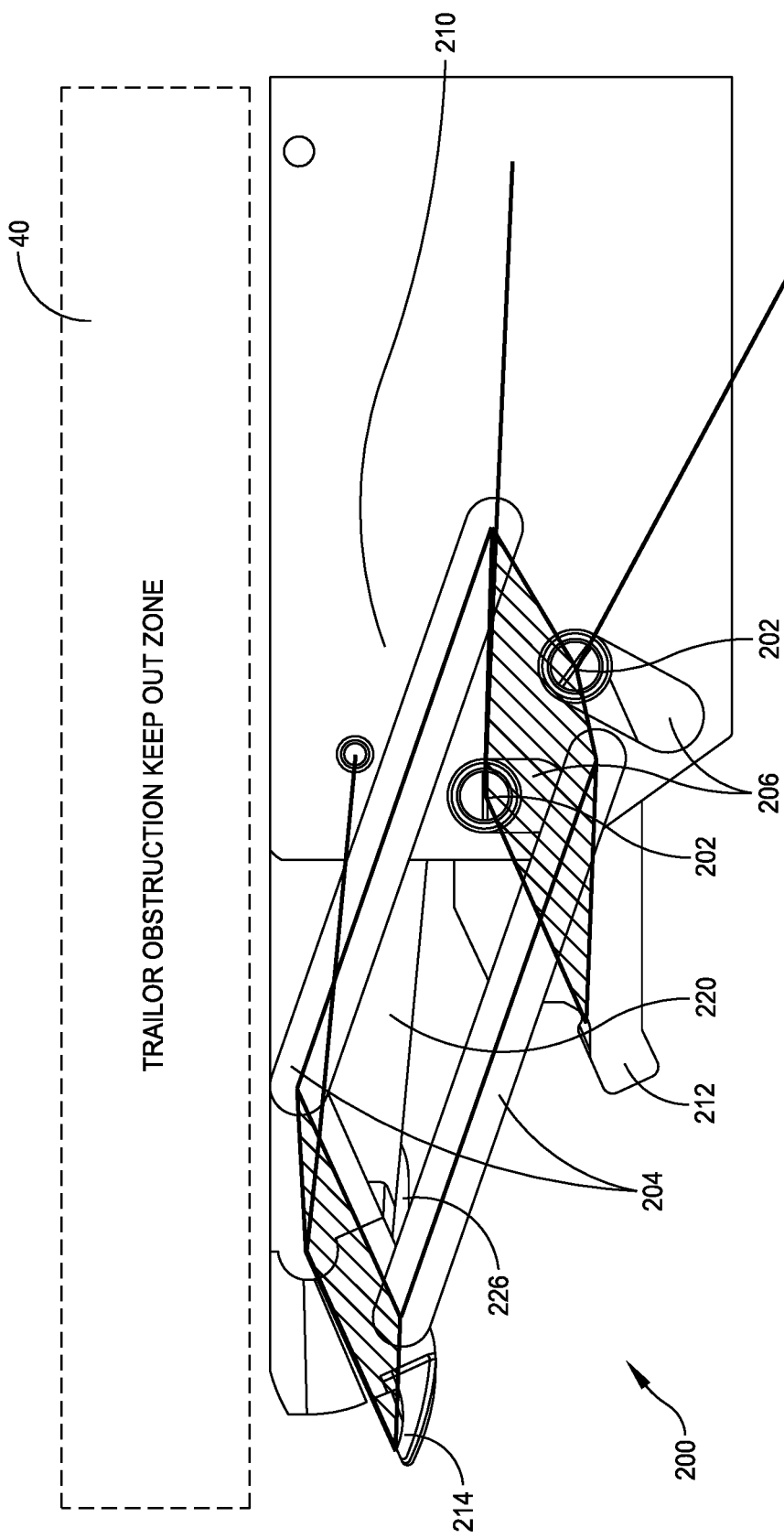
FIGS. 12A-12C are partial cross-section views of a gladhand coupler assembly of another embodiment of the present disclosure.
Figure 12B:
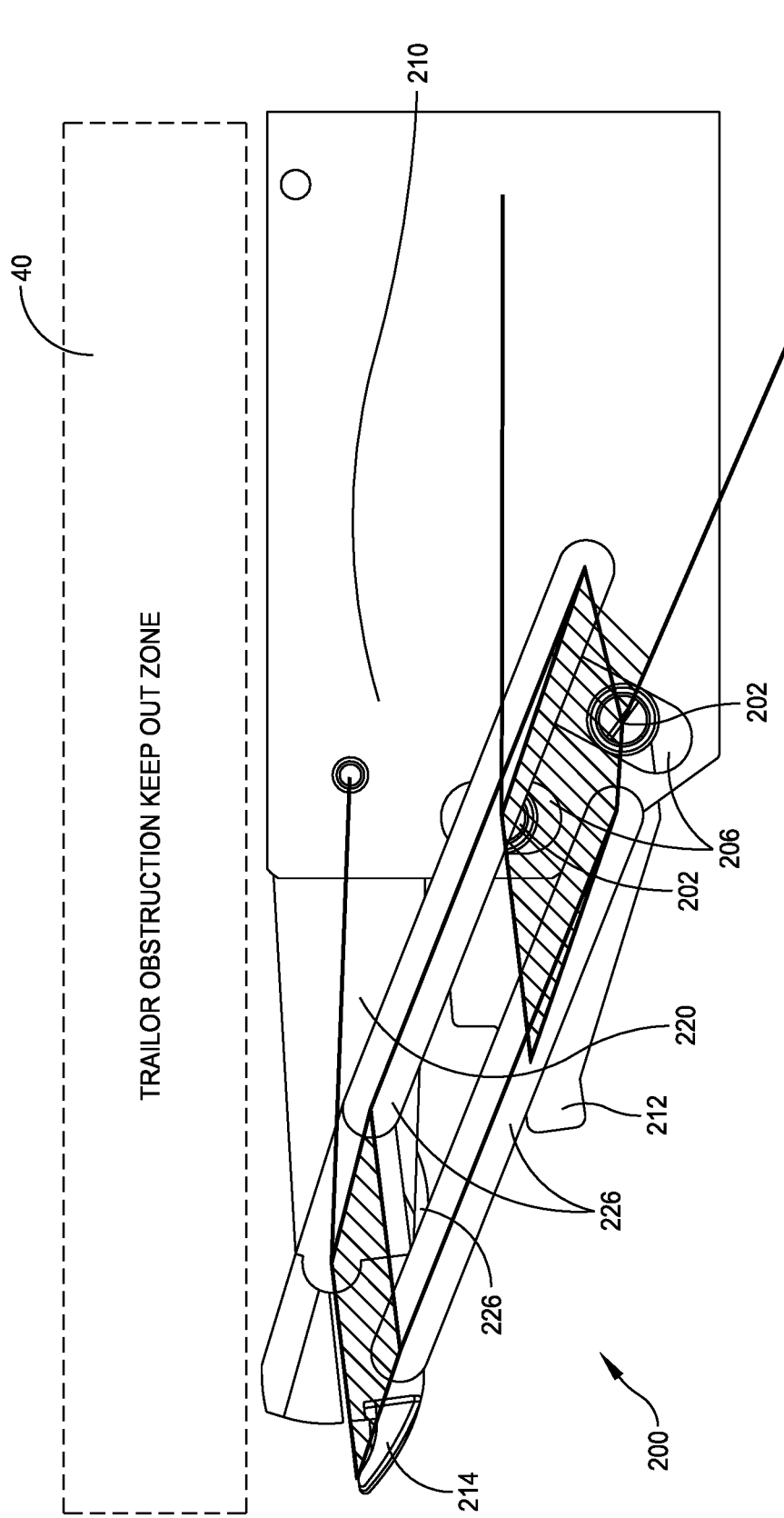
Figure 12C:
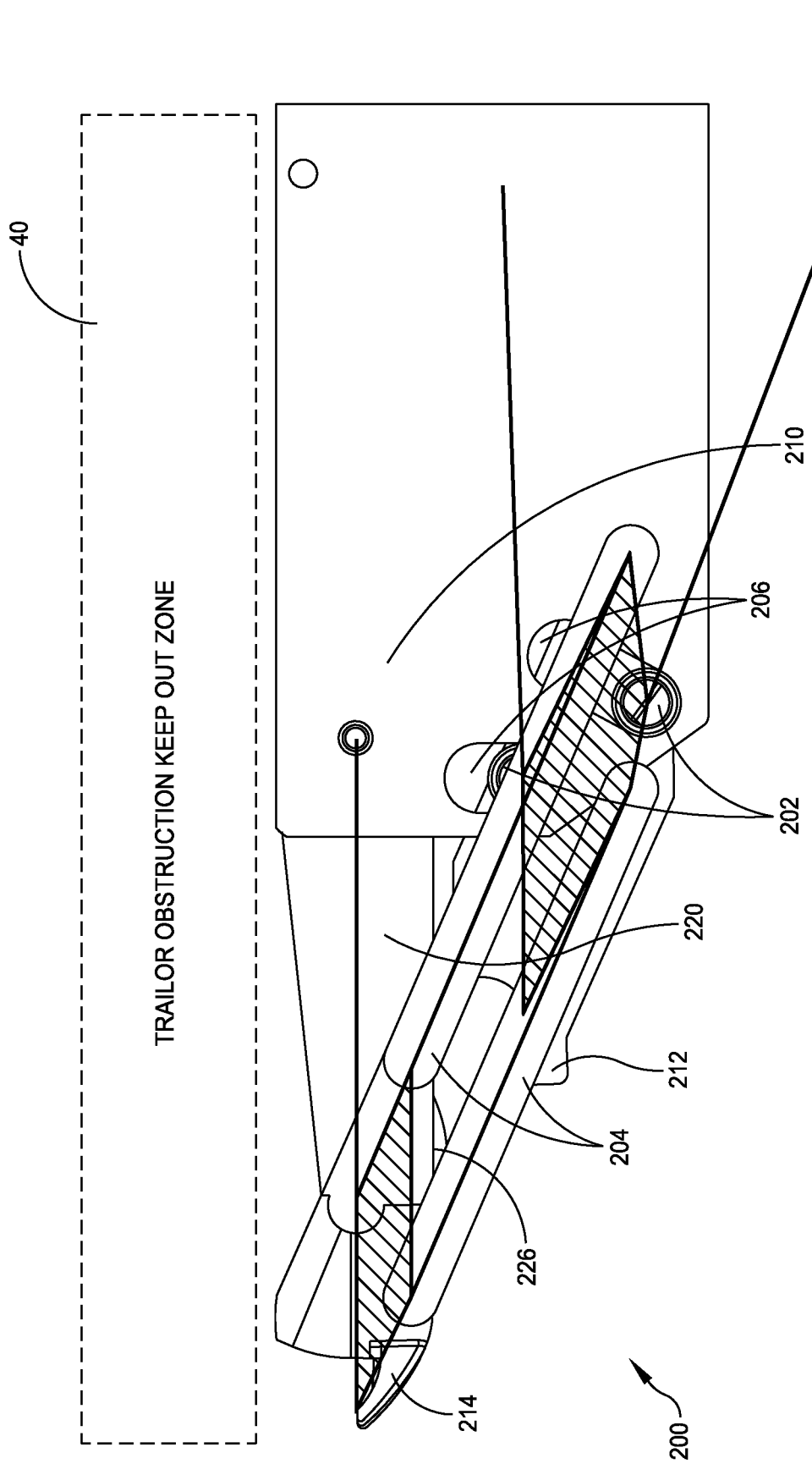

Referring to FIGS. 12A-12C, an embodiment of the gladhand coupler assembly is generally indicated at 200. In this embodiment, the gladhand coupler assembly 200 includes a 4-bar link, two bars of which are indicated at 204 (two identical bars are not shown, but are present on the other side of the gladhand coupler assembly), rather than a cam and cam follower configuration, to actuate the gladhand coupler assembly between first and second positions. The gladhand coupler assembly can be moved between first and second positions by coupling a motor (not shown) to the actuation mechanism. For example, a linear actuator such as a pneumatic cylinder or linear motor could exert a force between coupler support 210 and first locking structure 212, or a rotary actuator could be coupler to one of the pivoting joints to cause rotation of a pivoting link (such as 4-bar link 204) about its pivot point. Alternatively, the gladhand coupler assembly can be moved between first and second positions manually. It will be noted that this linkage design is exemplary, and that any appropriate configuration of linkages is acceptable. It will be appreciated that certain linkage designs may provide increased clearance between the first and second locking structures 112, 114 of the gladhand coupler assembly, and may provide improved mechanical characteristics for locking. It will also be noted that this embodiment of the gladhand coupler assembly 100 also does not violate the keep-out zones, e.g., trailer keep out zone 40, and does not require any twisting or rotational movement relative to the plane of the gladhand coupler 10 mating seal 16 to lock in place, in the second position or in the transition from the first to the second position, with a gladhand coupler, e.g., gladhand coupler 10. Any appropriate mechanism, for example a motor driving the mechanical linkage, may be used to actuate the system.

FIG. 12A illustrates this embodiment of the gladhand coupler assembly 200 in the distal or first position. As shown, the gladhand coupler assembly 200 includes linkages 204, which are configured such that first and second locking structures 212, 214 are synchronized. The locking structures 212, 214 of the gladhand coupler assembly 200 move in unison, by the same amount and at the same rate. Furthermore, the first and second locking structures 212, 214 of the gladhand coupler assembly 200 are not coupled directly together. Instead, the first locking structure 212 and second locking structure 214 are coupled together by the linkages 204. The second locking structure 214 is further pivotably coupled to a coupler arm 220, which is further pivotably coupled to a coupler support 210. The first locking structure 212 is coupled to the coupler support by two pivotably configured securing members, each indicated at 202, which are further slidably configured in channels 206 allowing the first locking structure to pivot. It will be appreciated that any mechanical configuration capable of allowing the synchronous movement of the first and second locking structures 212, 214 is acceptable. It will also be noted that this embodiment retains the advantages of the other embodiments, including using the locking structures as guides to prevent contact between a mating seal 226 of the coupler arm 220 and the mating seal 16 of the gladhand coupler 10 prior to engaging the system in the mating or second position.

FIG. 12B shows the gladhand coupler assembly 200 in transition between the first and second positions. It will be noted that the coupler arm 220 is in a transitory position between the first and second positions.

FIG. 12C shows the gladhand coupler assembly 220 in the engaged or second position. It will be noted that no active power is needed to maintain the gladhand coupler assembly in the second position. In this position, the mechanism is locked until active power is applied to unlock the assembly and transition back to the first position.

Figure 13A:
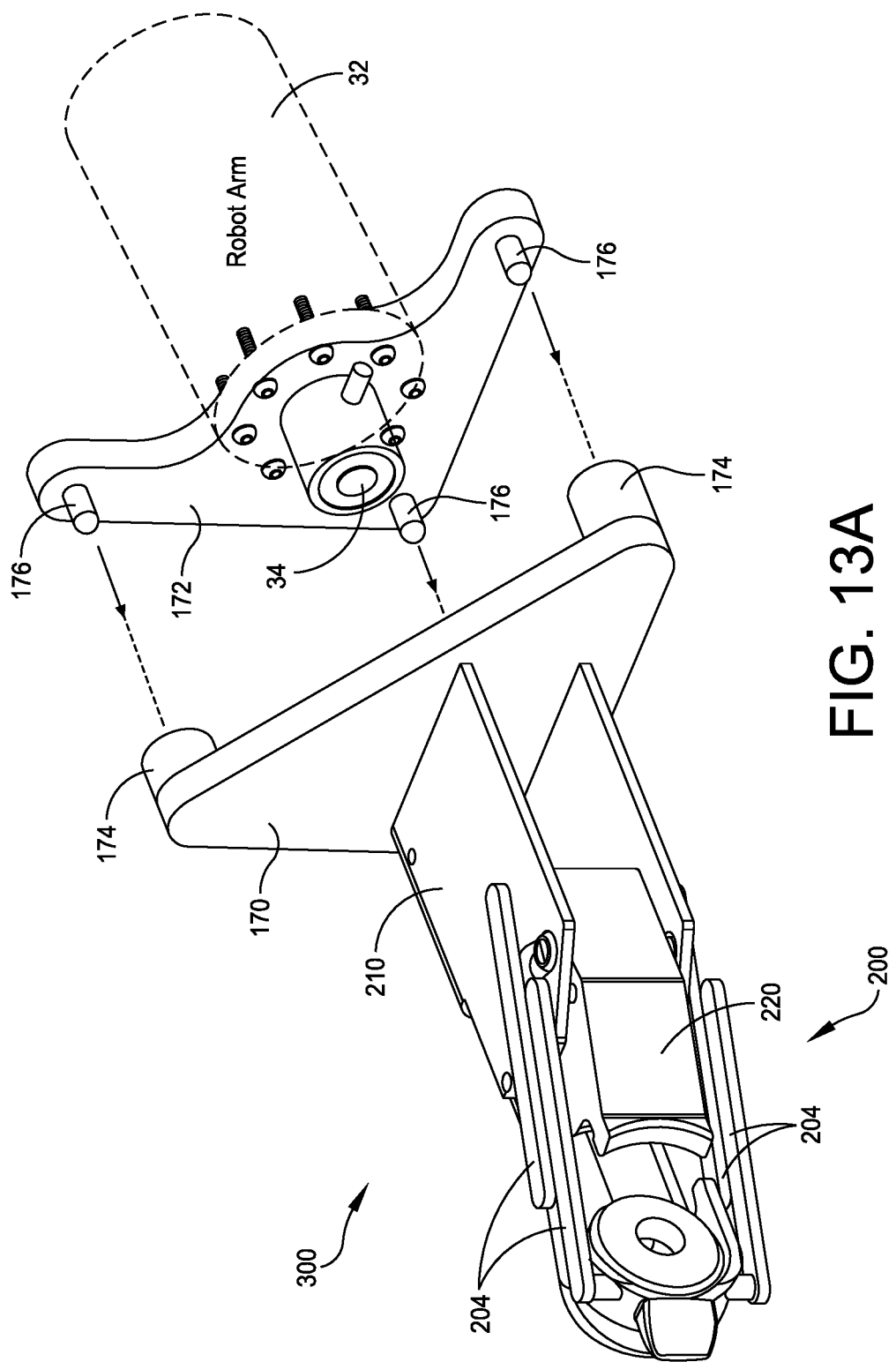
FIGS. 13A-13C are perspective views of a gladhand coupler assembly of another embodiment of present disclosure configured to be secured to a robotic arm.
Figure 13B:
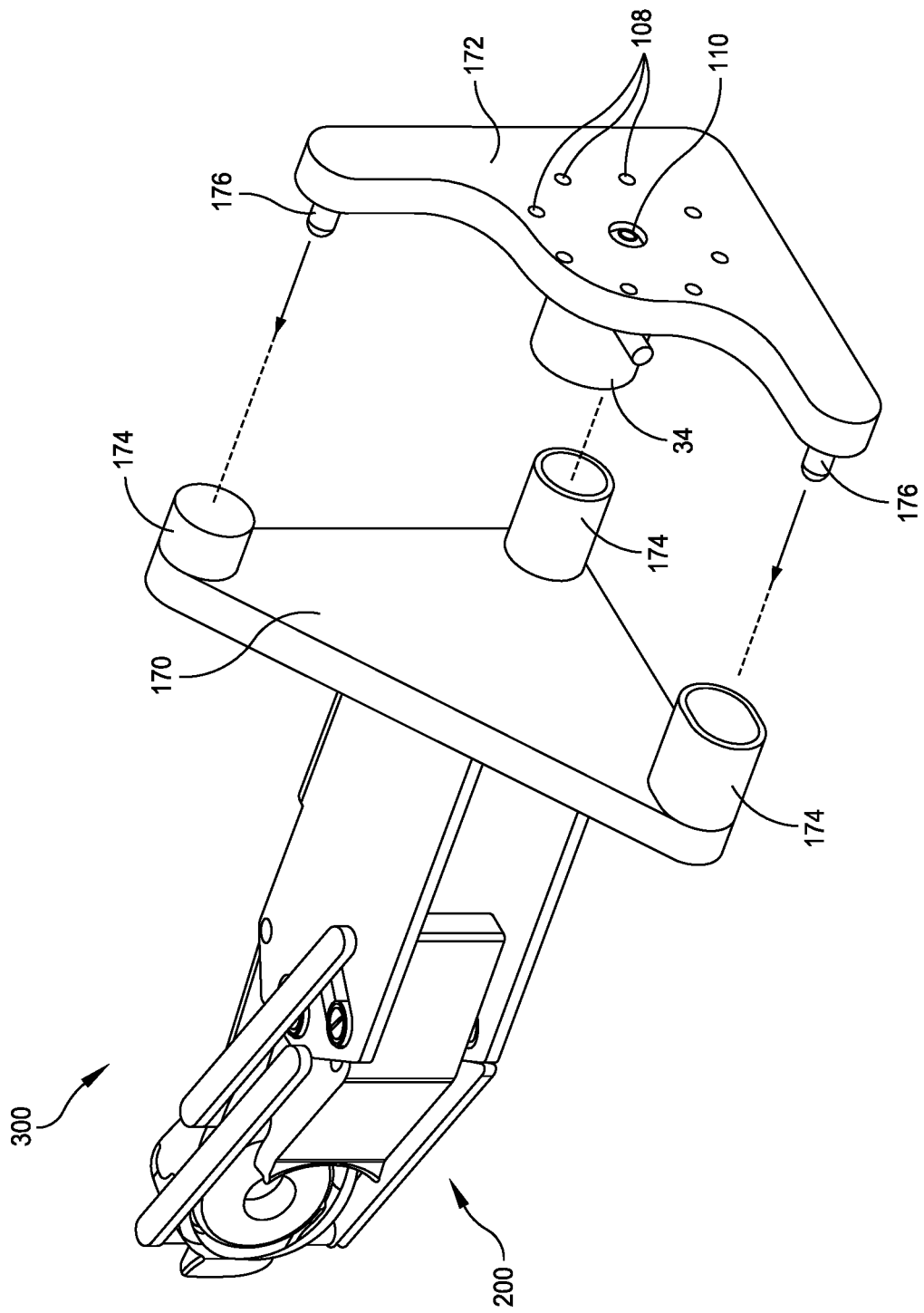
Figure 13C:
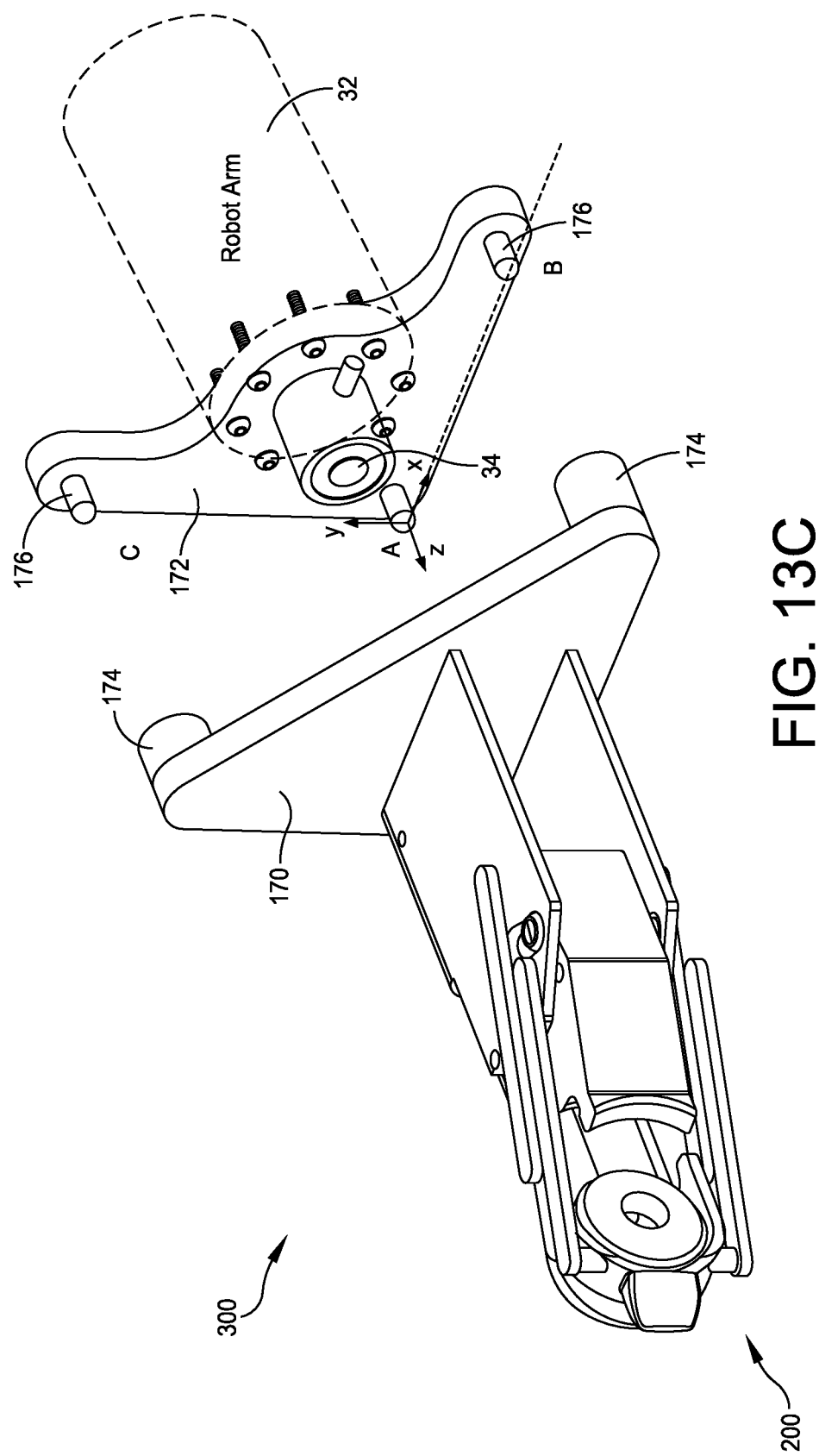

Referring to FIGS. 13A-13C, the gladhand coupler assembly with robotic arm and brackets is generally indicated at 300. As shown, the gladhand coupler assembly is configured to be connected to a robotic arm or similar device, indicated at 32. In this embodiment, the linkage-based approach to engaging the gladhand coupler assembly is shown; however, it will be appreciated that the cam- and cam follower-based embodiment may also be used, as may any other embodiment using an appropriate actuation mechanism.

FIG. 13A shows the gladhand coupler assembly 200 secured to a first bracket 170 on one side of the first bracket. In this embodiment, the other side of the first bracket 170 has three female connector elements, each indicated at 174 (one not shown) configured to be coupled with complimentary male connector elements. A second bracket 172 associated with the robotic arm 32 has three male connector elements, each indicated at 176, which are configured to be releasably coupled with the female connector elements of the first bracket. As shown, the male connector elements 176 of the second bracket 172 are inserted into respective female connector elements 174 of the first bracket 170. The connector elements may be of any appropriate type, for example, the female connector elements can be uniquely shaped receptacles, and the male connector elements may be uniquely shaped in a complementary manner. In at least one embodiment, an electromagnet 34 associated with the robotic arm 32 is coupled to the second bracket 172 at a set point from the male connector elements 176. When activated, the electromagnet 34 generates a force on the three respective male and female connector elements. This force couples the first and second brackets 170, 172 together while the electromagnet 34 is activated. The robotic arm 32 is coupled to the second bracket 172. In at least one embodiment, the robotic arm is coupled by fasteners, such as fasteners 102, which can be screws, bolts, hooks, or any other appropriate securing device. The robotic arm 32 may be a multi-axis, multi-joint robotic arm, or any other type of robotic arm or appropriate equivalent. It will be appreciated that the system is configured to be coupled such that the brackets and gladhand coupler assembly move synchronously through space with the robotic arm.

FIG. 13B shows openings 108 for the fasteners, which couple the robotic arm to the second bracket, as well as an opening 110 for securing the electromagnet to the second bracket 172, which, in at least one embodiment, allows for the attachment of the electromagnet to the robotic arm to accomplish various desirable functions, for instance, allowing the robotic arm to activate and deactivate the electromagnet.

FIG. 13C shows some directions in which the second bracket 134 and robotic arm 32 may move, which includes moving forward and backward, up and down, and side to side along X-, Y- and Z-axes. It will be appreciated that the total system is also capable of rotational movement, including general spherical rotations in any direction, as well as other transformations such as rotating around an axis and so on. The brackets 132, 134, when coupled by the electromagnet 34, move synchronously in these directions, allowing the gladhand coupler assembly 200 to be oriented as desired in three-dimensional space. It will be noted that the brackets 132, 134 will continuously align with each other when the electromagnet 34 is activated.

Figure 14B:
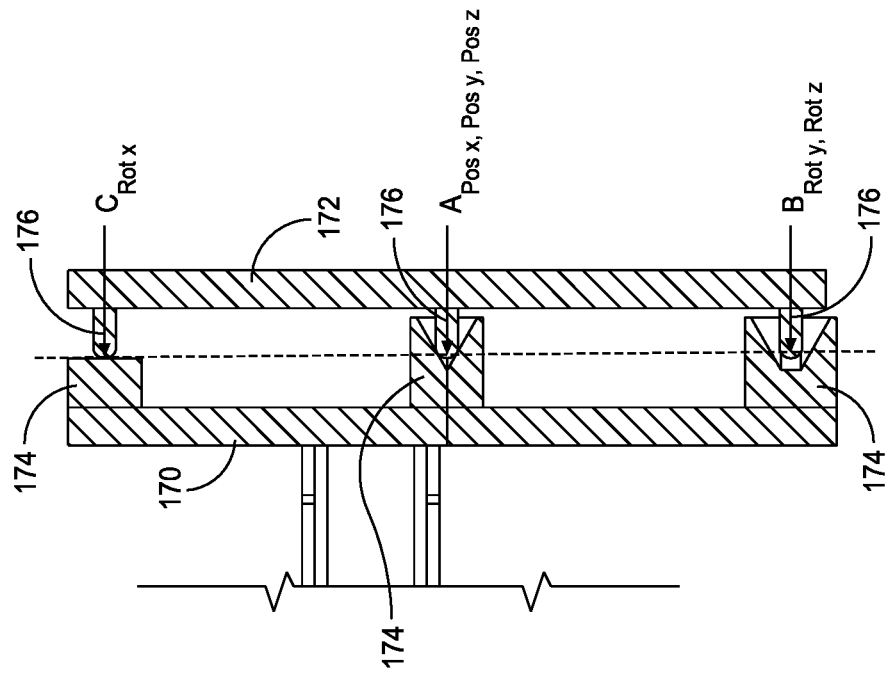
FIG. 14B is a top plan view of an embodiment of brackets connected together.
Figure 14A:
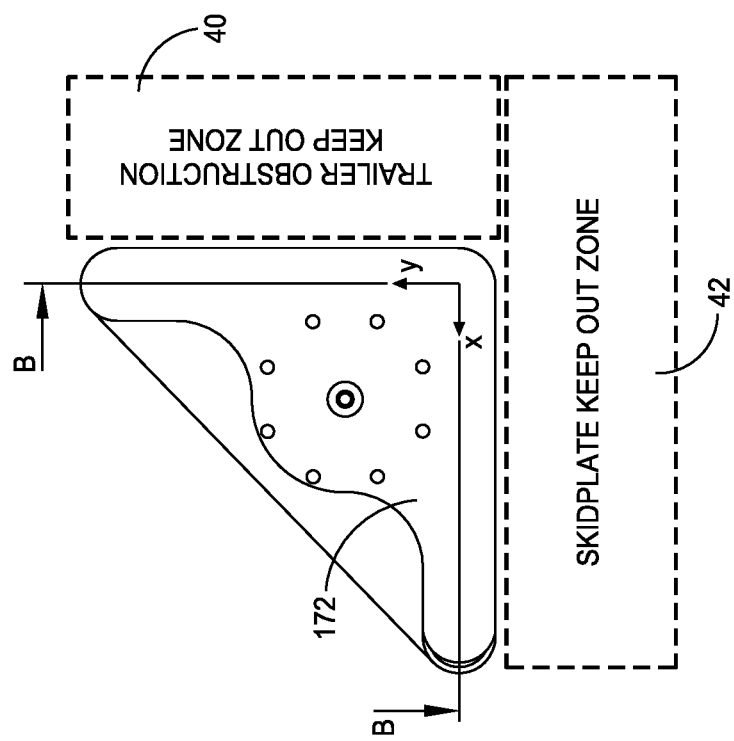
FIG. 14A is a side view of a bracket configured to connect to a robotic arm and to the gladhand coupler assembly's bracket.

FIGS. 14A and 14B illustrate one possible embodiment of the brackets used to connect the gladhand coupler assembly to the robotic arm, as well as further illustrations of the keep out zones.

FIG. 14A shows the second bracket 172 from the robotic arm side, and the movement of the second bracket to avoid the keep out zones 40, 42. Two keep out zones 40, 42 are shown, though it will be appreciated that any number of keep out zones may be presented to the operator. The trailer obstruction keep out zone 40 indicates areas or volumes of one or more spaces where obstructions attached to a trailer may be present. These obstructions may include the trailer itself or any other equipment coupled to the trailer. A skid plate keep out zone 42 indicates areas or volumes of one or more spaces where obstructions attached to a skid plate or the bed of the truck may be present. These obstructions may include the skid plate itself, as well as any equipment or other items present on or attached to the skid plate. These keep out zones are purely illustrative. Other keep out zones may also be defined according to the presence or absence of obstructions which may interfere with the operation of the gladhand coupler assembly.

FIG. 14B shows one possible structure for the first and second brackets 170, 172 and their respective connector elements 174, 176. The second bracket 172 is coupled to three male connector elements 176, which are coupled at one end to the second bracket and at the other end have hemispherical points. The first bracket 170 is coupled to the female mating seals 174, which are shown in three configurations. In the first configuration, at point C, the female mating seal is a flat plateau. In the second configuration, at point B, a cylindrical receptacle is used. In the final configuration, at point A, a conical receptacle is used instead. Any of these configurations may be used, as may appropriate combinations of these configurations or alternative, equivalent configurations.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A gladhand coupler assembly configured to releasably couple to a gladhand coupler having a mating seal and first and second locking structures, the gladhand coupler assembly comprising:
    an assembly mating seal for interfacing with the gladhand coupler mating seal;
    first and second assembly locking structures coupled to the assembly mating seal, the first and second assembly locking structures being configured to interface with the gladhand coupler first and second locking structures, respectively, the first and second assembly locking structures being rigidly fixed to each other so as to limit independent motion of the first assembly locking structure relative to the second assembly locking structure; and
    an actuation mechanism coupled to at least one of the assembly mating seal and the first and second assembly locking structures,
    wherein the actuation mechanism is configured to move the assembly mating seal relative to the pair of rigidly fixed assembly locking structures, and
    wherein the gladhand actuation mechanism is further configured to place the assembly mating seal into and out of fluid communication with the gladhand coupler mating seal.

2. The gladhand coupler assembly of claim 1, wherein the actuation mechanism allows manual operation.

3. The gladhand coupler assembly of claim 1, wherein the actuation mechanism includes a motor and a mechanical linkage coupled to the motor.

4. The gladhand coupler assembly of claim 3, wherein the motor is a rotary pneumatic or electromagnetic motor.

5. The gladhand coupler assembly of claim 3, wherein the motor is a linear motor.

6. The gladhand coupler assembly of claim 3, wherein the mechanical linkage includes a 4-bar linkage.

7. The gladhand coupler assembly of claim 3, wherein the mechanical linkage includes a cam associated with the motor and a cam follower coupled to the at least one of the assembly mating seal and the first and second assembly locking structures.

8. The gladhand coupler assembly of claim 3, further comprising a support and an assembly coupler arm, wherein the assembly coupler arm is pivotably coupled to the support.

9. The gladhand coupler assembly of claim 8, further comprising at least one spring configured to bias one of the support and the assembly coupler arm.

10. The gladhand coupler assembly of claim 3, wherein the motor is configured to lock the mechanical linkage in place to maintain the assembly mating seal in fluid communication with the gladhand coupler mating seal.

11. A method of releasably securing a gladhand coupler assembly to a gladhand coupler, the method comprising:
    providing the gladhand coupler assembly configured to manipulate an assembly mating seal and first and second assembly locking structures with respect to a mating seal and first and second locking structures of the gladhand coupler;
    initializing the gladhand coupler assembly into a disengaged position;
    positioning the gladhand coupler assembly with respect to the gladhand coupler so that the mating seal and the first and second locking structures of the gladhand coupler are proximate to the assembly mating seal and the first and second assembly locking structures of the gladhand coupler assembly, with the first and second assembly locking structures being rigidly fixed to each other so as to limit independent motion of the first assembly locking structure relative to the second assembly locking structure, and with the mating seals unable to touch each other while in the disengaged position; and
    actuating the gladhand coupler assembly to move the gladhand coupler assembly from engaged and disengaged conditions and to place the assembly mating seal into and out of fluid communication with the gladhand coupler mating seal to lock the assembly mating seal with respect to the mating seal of the gladhand coupler.

12. The method of claim 11, wherein positioning the gladhand coupler assembly includes using a robotic arm to position the gladhand coupler assembly with respect to the gladhand coupler.

13. The method of claim 11, wherein actuating the gladhand coupler assembly includes using an actuation mechanism to move the gladhand coupler assembly.

14. The method of claim 13, wherein the actuation mechanism includes a motor.

15. The method of claim 11, further comprising biasing the assembly mating seal.

16. A gladhand coupler assembly configured to releasably secure a gladhand coupler having a first mating seal and first and second locking structures, the gladhand coupler assembly comprising:
- a coupler support including first and second assembly locking structures rigidly fixed to each other so as to limit independent motion of the first assembly locking structure relative to the second assembly locking structure;
- a coupler arm pivotably connected to the coupler support, the coupler arm being in fluid communication with a pneumatic air source, the coupler arm including a second mating seal and being configured to move relative to the coupler support, when the first and second assembly locking structures are proximate to the first and second locking structures of the gladhand coupler, between a first position in which the second mating seal is spaced from the first mating seal and a second position in which the second mating seal of the gladhand coupler assembly sealingly engages the first mating seal of the gladhand coupler and the gladhand coupler assembly is secured to the gladhand coupler; and
- an actuation mechanism configured to move the coupler arm between the first position and the second position.

17. The gladhand coupler assembly of claim 16, wherein the actuation mechanism includes a motor assembly having a motor supported by the coupler support.

18. The gladhand coupler assembly of claim 17, wherein the coupler arm includes a cam follower, and wherein the motor assembly further includes a cam coupled to the motor, the cam being configured to manipulate the cam follower to move the coupler arm between the first position and the second position.

19. The gladhand coupler assembly of claim 16, further comprising a spring to bias the coupler arm with respect to the coupler support to the first position.

20. The gladhand coupler assembly of claim 19, wherein the spring is secured at one end to the coupler support and at an opposite end to the coupler arm.

21. A method of securing a gladhand coupler assembly to a gladhand coupler having a first mating seal and first and second locking structures, the method comprising:
- providing the gladhand coupler assembly configured to be manipulated between a first position, in which a second mating seal of the gladhand coupler assembly is spaced from the first mating seal, and a second position, in which the second mating seal of the gladhand coupler assembly sealingly engages the first mating seal of the gladhand coupler, the gladhand coupler assembly including first and second assembly locking structures that are rigidly fixed to each other so as to limit independent motion of the first assembly locking structure relative to the second assembly locking structure;
- positioning the gladhand coupler assembly with respect to the gladhand coupler so that the first mating seal of the gladhand coupler is proximate to the second mating seal of the gladhand coupler assembly; and
- operating the gladhand coupler assembly to move the gladhand coupler assembly from the first position to the second position to secure the gladhand coupler to lock the second assembly mating seal with respect to the first mating seal of the gladhand coupler.

22. The method of claim 21, wherein positioning the gladhand coupler assembly includes using a robotic arm to position the gladhand coupler assembly with respect to the gladhand coupler.

23. The method of claim 21, wherein operating the gladhand coupler assembly includes using an actuation mechanism to move the gladhand coupler assembly from the first position to the second position.

24. The method of claim 21, further comprising biasing the coupler arm to the first position.

25. The method of claim 24, wherein biasing the coupler arm includes a spring secured at one end to the coupler support and at an opposite end to the coupler arm.

* * * * *